R. B. CREASY.
SAW FILING MACHINE.
APPLICATION FILED JAN. 16, 1918.

1,297,547.

Patented Mar. 18, 1919.
11 SHEETS—SHEET 2.

Inventor
R. B. Creasy.
By
Attorneys

R. B. CREASY.
SAW FILING MACHINE.
APPLICATION FILED JAN. 16, 1918.

1,297,547.

Patented Mar. 18, 1919.
11 SHEETS—SHEET 7.

Inventor
R. B. Creasy.

By
[signature], Attorneys

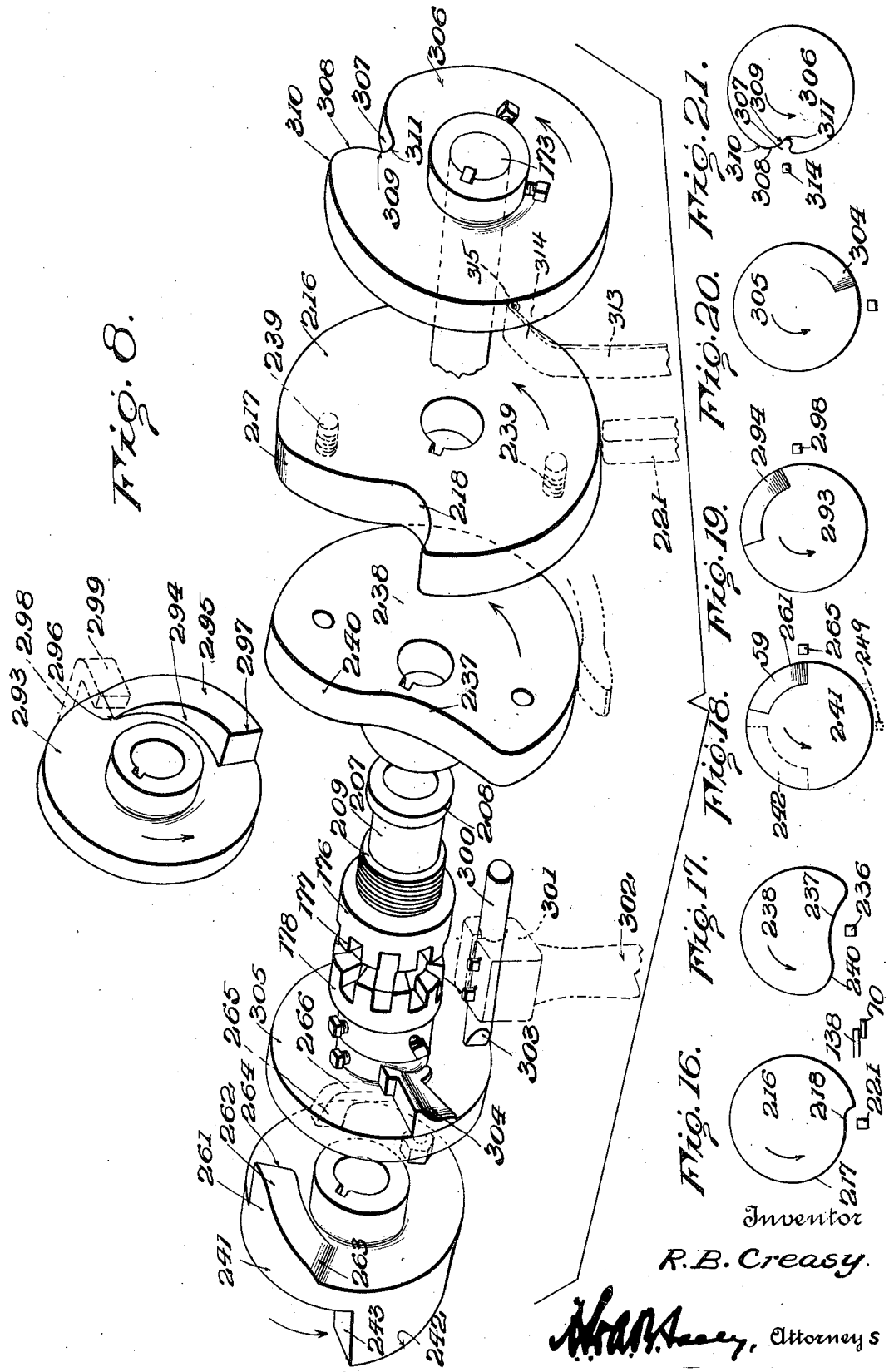

R. B. CREASY.
SAW FILING MACHINE.
APPLICATION FILED JAN. 16, 1918.
1,297,547.
Patented Mar. 18, 1919.
11 SHEETS—SHEET 9.
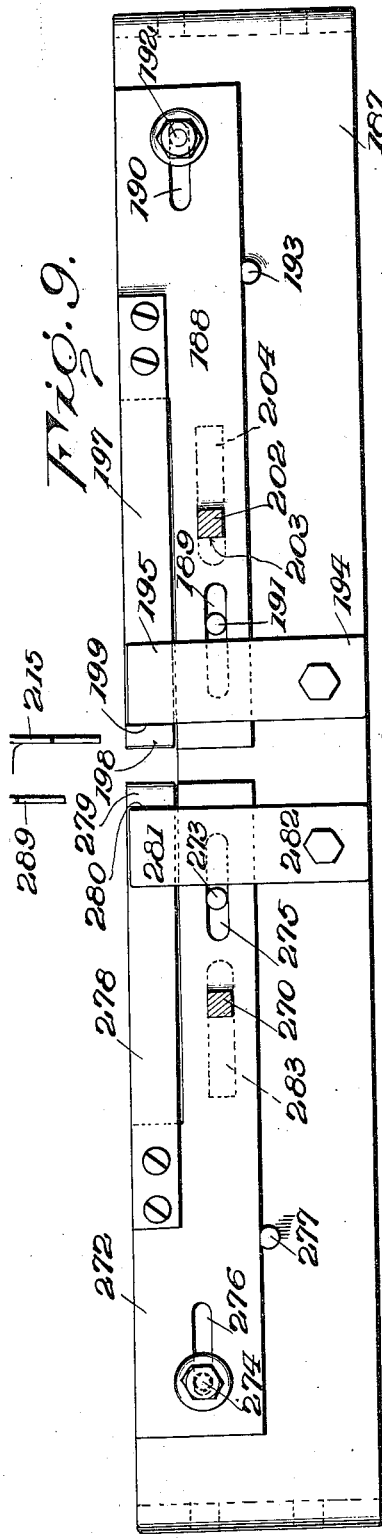
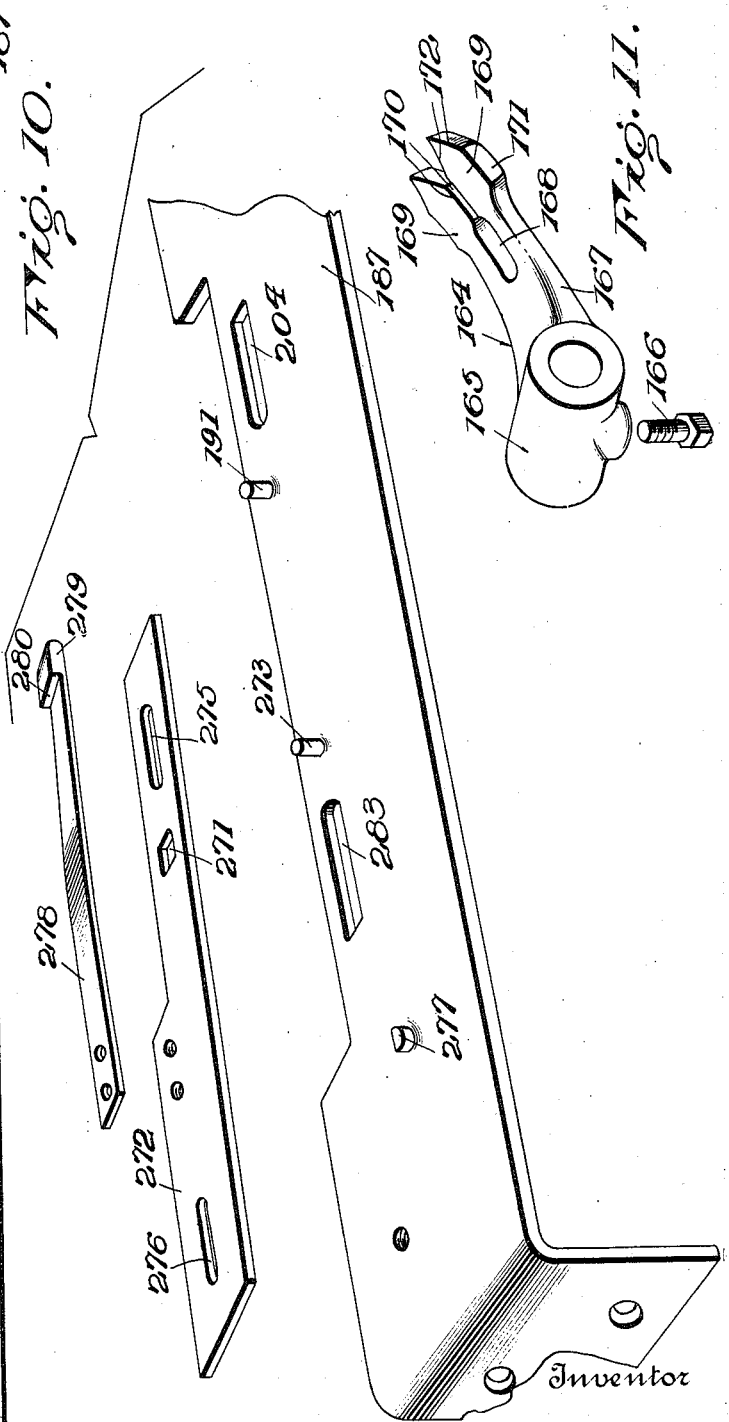
Inventor
R. B. Creasy
By
Attorneys R. B. CREASY.
SAW FILING MACHINE.
APPLICATION FILED JAN. 16, 1918.
1,297,547.
Patented Mar. 18, 1919.
11 SHEETS—SHEET 10.
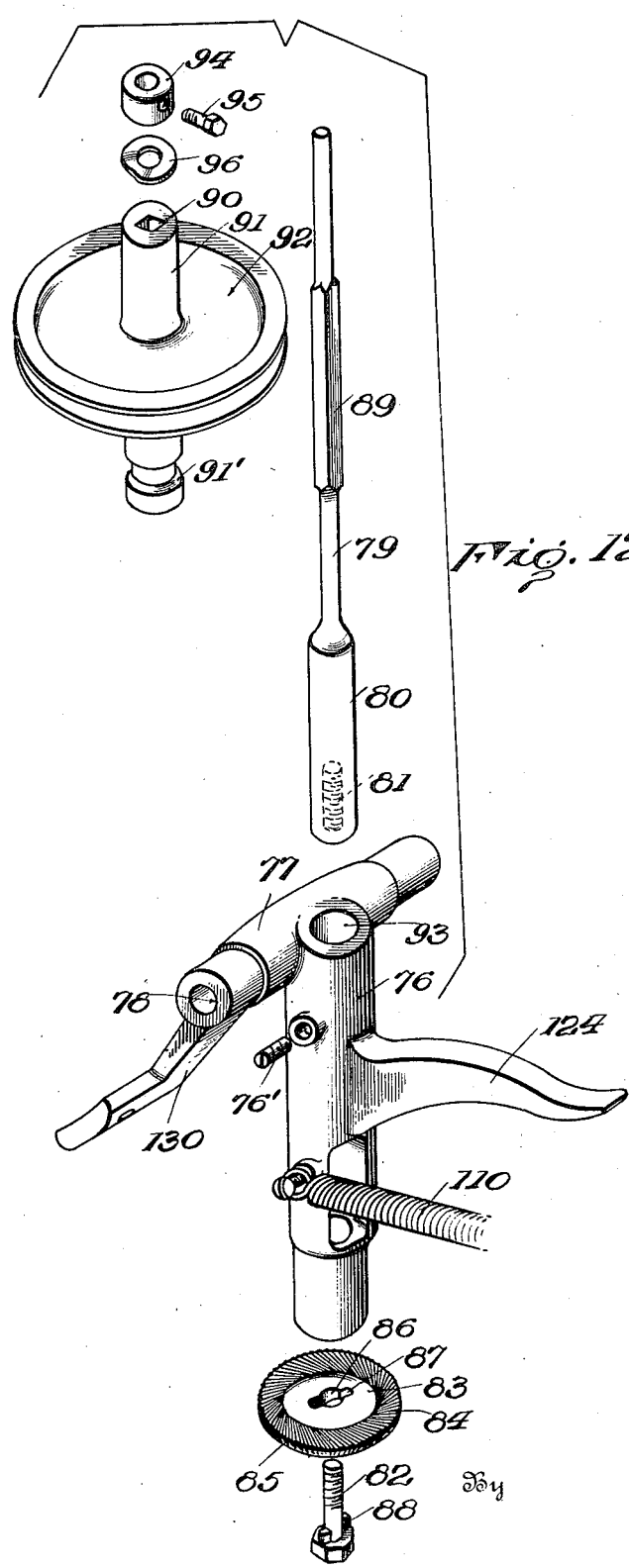
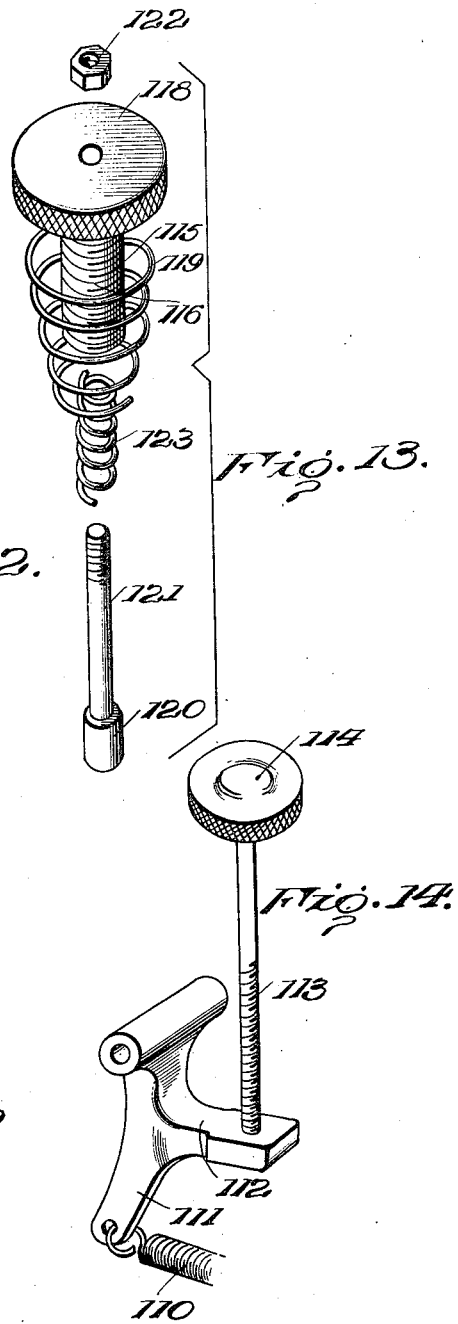
Inventor
R. B. Creasy.
By
Attorneys

UNITED STATES PATENT OFFICE.

REUBEN BENJAMIN CREASY, OF BALLINGER, TEXAS.

SAW-FILING MACHINE.

1,297,547.

Specification of Letters Patent.    Patented Mar. 18, 1919.

Application filed January 16, 1918.   Serial No. 212,118.

*To all whom it may concern:*

Be it known that I, REUBEN B. CREASY, a citizen of the United States, residing at Ballinger, in the county of Runnels and State of Texas, have invented certain new and useful Improvements in Saw-Filing Machines, of which the following is a specification.

This invention relates to machines for filing the saws employed in cotton ginning and delinting machines.

It is one aim of the present invention to provide a machine which will be adapted to accommodate the saw shaft and all of the saws thereon as taken directly from the gin and which when once set in operation will automatically file the teeth of all of the saws and automatically cease its operation after all of the saws have been filed, thus requiring no attention whatsoever on the part of the operator after being once adjusted and started.

Another aim of the invention is to provide a gin saw filing machine which, as stated above, is entirely automatic in its operation and which may be adjusted so as to adapt it to act upon a greater or less number of saws so that saw shafts from different types or makes of gins may be placed within the machine with the saws carried thereby and the said saws sharpened automatically by the machine regardless of their number.

Another aim of the invention is to provide a gin saw filing machine which may be adjusted to accommodate saws of different diameters and spaced apart different distances upon their supporting shaft and which may also be adjusted to act upon saws having various numbers of teeth so that the machine may be employed in sharpening the saws from gins of different makes, which saws may vary in diameter, spacing, and in the number and size of their teeth.

The machine of the present invention is, as stated, adapted to act upon a number of saws to file or gum the teeth thereof and the machine embodies a number of file carriages upon each of which is mounted a rotary file. As each file is designed to act upon a number of the saws, of which the entire number of saws upon the gin saw shaft is substantially a multiple, the invention aims to provide means for automatically successively presenting the teeth of corresponding ones of the series of saws to the files and after all of the teeth upon the first saw of each series have been filed, automatically shifting the files so as to present them to the second saws in the respective series, this operation being automatically continued until all of the teeth of all of the saws of each series have been filed.

In conjunction with the automatic means just referred to the invention contemplates the provision of means for automatically stopping the operation of the entire machine immediately after the last tooth on the last saw of each series has been filed so that, as before stated, after a gin saw shaft and the saws carried thereby as taken from the gin have been placed within the machine and the machine adjusted and started, no further attention is required on the part of the operator until after all of the saws of all of the series have been filed or gummed. As some gin saw shafts may be found to carry saws of a number which is not exactly a multiple of the number of file carriages and files and as therefore under such conditions there will be one or several saws which will remain to be filed after the predetermined number of saws have been filed, the invention aims, incidentally, to provide means whereby these additional saws may be acted upon by the files.

The machine embodying the present invention has its files so mounted that they may be oscillated in a manner to be brought into and out of position to act upon the teeth of the saws of the several series, and the invention aims to provide means for gradually constantly rotating the shaft carrying the saws and means for automatically moving the files into filing engagement with the teeth of corresponding saws of the several series whereby to simultaneously file the said teeth, automatically moving the files out of filing engagement with the teeth until the saws have been rotated to bring the next succeeding tooth into position for filing, and then again automatically moving the files into position to file the newly presented tooth, this operation being repeated until all of the teeth of corresponding ones of the saws of the several series have been filed, whereupon other automatic means embodying the invention is brought into action for shifting all of the file carriages so that the files may be presented to the teeth of the next saw in each respective series.

One of the principal aims of the invention is to so construct the means for controlling the number of the files above mentioned and to so mount the files that as the files are brought into filing engagement with the teeth of the saws the peripheries of the files will be guided and caused to ride up into the throats between adjacent teeth in a manner to insure of even, accurate and thorough filing of the teeth regardless of their condition. For the purpose just stated the files, which are circular and are supported upon rotary spindles, have their spindles so mounted that they may move upwardly in their bearings to permit the beveled peripheries of the files riding up upon the teeth and into the throats between the teeth without grinding away the teeth to too great a degree which would be likely to occur if the spindles for the files had no such play. Thus the invention contemplates the provision of means whereby the files will automatically accommodate themselves to the teeth to be filed or gummed regardless of the condition of the teeth and irregularities due to wear or injury which they may have received in the gin.

In connection with the files the invention also aims to provide means for causing the files to follow up into the throats between the teeth as the teeth are filed down, this means, however, being of a yieldable nature so that the files will not be caused to too forcibly engage the teeth. The invention also aims to provide in connection with the bearings for the file spindles, which bearings are mounted for oscillation, and are oscillated through the yieldable means just referred to, means for limiting the depth of cut of the files into the throats between the teeth so that all of the teeth upon all of the saws will be uniformly filed, this means being furthermore, of an adjustable nature so that the depth of cut may be readily regulated to suit the operator of the machine.

It is also an object of the present invention to provide in connection with the files and their oscillatory supporting bearings, means for cushioning the movement of the files and their bearings as the files are brought into filing engagement with the saw teeth, thereby absorbing any vibratory shock due to the oscillatory movement of the said bearings.

In connection with the spindle for each file there is provided means for yieldably supporting the spindle against downward movement so that should the file be brought into engagement with a tooth, the point of which has been bent over, the file may yield downwardly so as to pass into the throat of the tooth without filing off too much of the under side of the tooth or without likelihood of completely destroying the tooth.

Another aim of the invention is to provide, in conjunction with each file, a stabilizing member designed to straddle the saw being acted upon by that particular file, which guide member serves to brace the saw against vibration incident to the engagement of the file against the teeth of the saw so that the saw will be held firmly and in a manner to permit of the file performing its filing or gumming operation in the most efficient manner.

The invention also contemplates so constructing the stabilizing member, above referred to, that the same will, when moved into position straddling the saw to be filed, act also to spread away to a slight degree the saws at the opposite sides of the saw to be filed so that there will be no likelihood of side cutting of the last-mentioned saws by the file.

All of the stabilizing members of the machine are mounted upon a single shaft whereby to be moved in unison and the invention aims to provide means for automatically oscillating this shaft so as to move the stabilizing members into engagement with the saws to be filed substantally simultaneously with the movement of the files into filing position at the beginning of the filing operation upon any particular set of saws, the means being arranged also to act automatically to move the stabilizing members out of engagement with the saws after all of the teeth of a set of saws have been filed and immediately prior to shifting of the saw carriage from one set of saws to another. Incidentally, the invention contemplates the provision of means whereby the shaft may be oscillated manually so as to move the stabilizing members out of engagement with the saws.

As concerns the machine as a whole, the invention aims to provide for the automatic movement of the files into filing engagement with the corresponding saws of the several series, the automatic rotation of the saws and the automatic adjustment of the files to the teeth during the filing operation, the automatic movement of the stabilizing members into engagement with the saws when the files are brought into filing engagement with the first tooth to be filed of a set, the automatic movement of the saws of a set, the automatic movement of the files out of filing engagement with the saws of a set after all of the teeth of each saw of the set have been filed, the simultaneous movement of the stabilizing members out of engagement with the saws of the set, the subsequent automatic shifting of the saw carriages to bring the files into position opposite the corresponding next saws of the several series, and the automatic repetition of this operation until all of the teeth of all of the saws of the several series have been properly filed.

Another aim of the invention is to provide means whereby the file carriages may be quickly racked back after all of the saws upon a gin saw shaft have been filed in the machine and so as to occupy the proper position for the beginning of the filing operation upon the saws of another gin saw shaft when positioned within the machine.

Another aim of the invention is to provide means for swinging the supporting frame upon which the file carriages are mounted to position to permit of the introduction and removal of a gin saw shaft and the saws carried thereby.

In the accompanying drawings:

Fig. 8 is a group perspective view illustrating the several cams which control the various mechanisms which render the machine automatic in its operation;

Fig. 9 is a plan view of the trip mechanism above referred to;

Fig. 10 is a group perspective view illustrating several of the parts of said mechanism in disassembled relation;

Fig. 11 is a perspective view of one of the stabilizing members;

Fig. 12 is a group perspective view illustrating one of the files, its spindle, the bearing for the spindle, and various parts associated with the said bearing and spindle;

Fig. 13 is a group perspective view illustrating the parts comprising the cushioning abutment for the bearing for the file spindle;

Fig. 14 is a similar view illustrating the device employed for varying the tension of the spring which yieldably holds the file in filing contact with the teeth of the saw;

Fig. 15 is a perspective view of a portion of the supporting base frame for the mechanism of the machine;

Fig. 16 is a diagrammatic view of the cam for causing movement of the files entirely clear of the saws prior to shifting of the file carriages, the said cam being shown in its initial position and the view also illustrating diagrammatically the relative position of the element to be moved by the cam;

Fig. 17 is a diagrammatic view of the cam which acts to cause movement of the stabilizing members out of position straddling the saws prior to shifting of the file carriages, the said cam being shown in its initial position and the view illustrating also diagrammatically the element to be acted upon by the cam;

Figure 22:
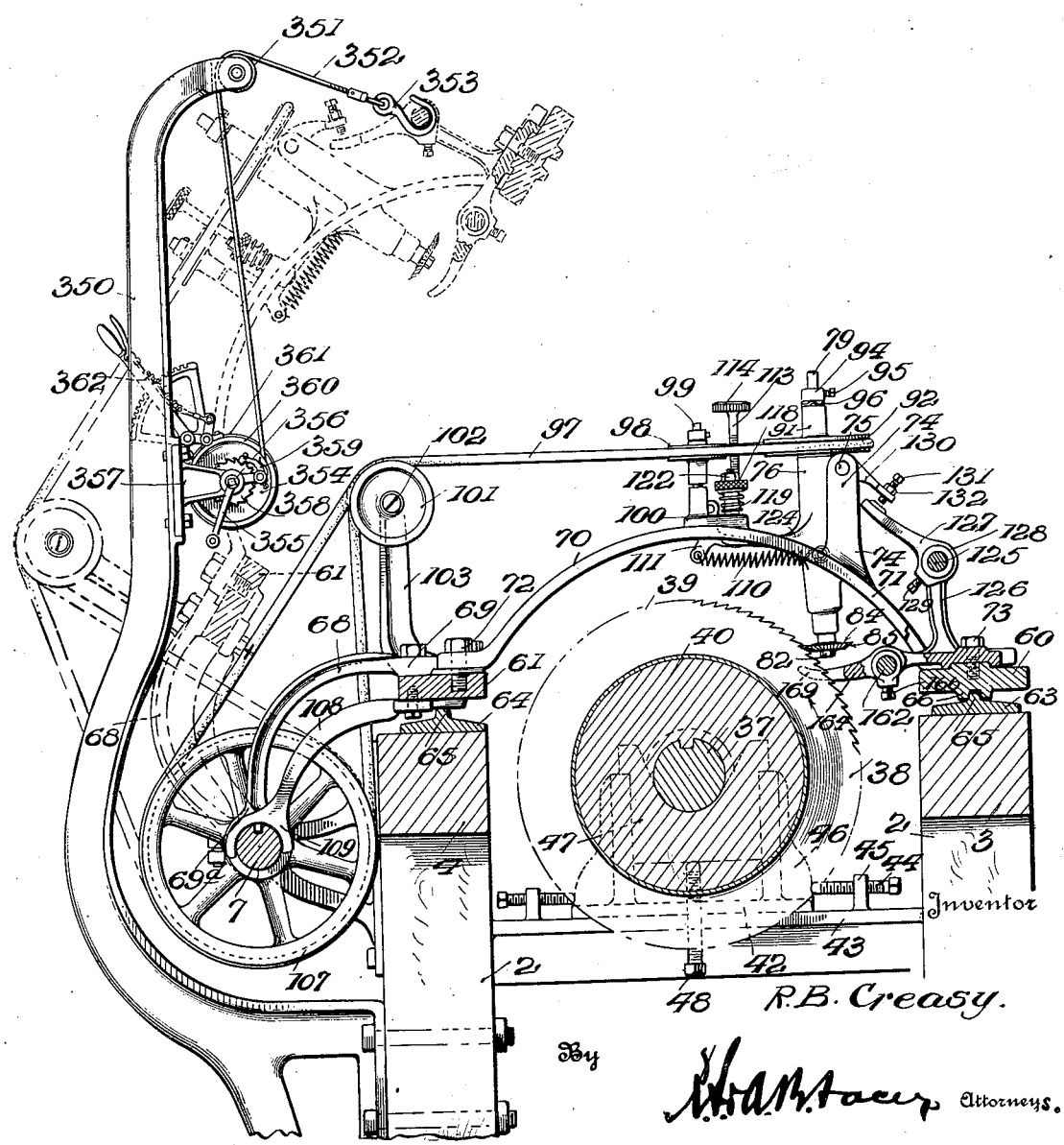

Fig. 18 is a diagrammatic view of the cam which operates to cause shifting of the file carriages and which also operates to reset the trip device through the release of which is released an element of the means provided for moving and supporting the files clear of the saws prior to shifting of the file carriages, the cam being shown in its initial position and the view illustrating also the elements which are acted upon by the cam, one face of the cam and the element engaged thereby being shown in full lines and the other face of the cam and the respective element to be engaged thereby being shown in dotted lines;

Fig. 19 is a diagrammatic view of the cam which operates to reset the trip device through the release of which the shaft, upon which all of the controlling cams are mounted, is clutched for rotation with its driving element, the said view illustrating the cam in its initial position and illustrating also the relative position of the element to be acted upon;

Fig. 20 is a diagrammatic view of the cam which operates to shift the driving member for the shaft, above mentioned, out of clutch with the clutch element upon the said shaft whereby to disconnect the power from the shaft, the view illustrating the cam in its initial position and illustrating also diagrammatically the relative position of the element to be acted upon by the cam;

Fig. 21 is a diagrammatic view of the cam which operates to complete the rotary motion of the cam shaft after the cam shown in Fig. 20 has performed its function, the view illustrating the cam in its initial position and illustrating also diagrammatically the element to be acted upon by the cam;

Fig. 22 is a view illustrating the means provided for raising and lowering the frame which supports the file carriages to provide for the introduction into and removal from the machine of a gin saw shaft and the saws carried thereby.

Fig. 23 is a view partly in side elevation and partly in section illustrating one of the bearings for the saw shaft.

Figure 1:
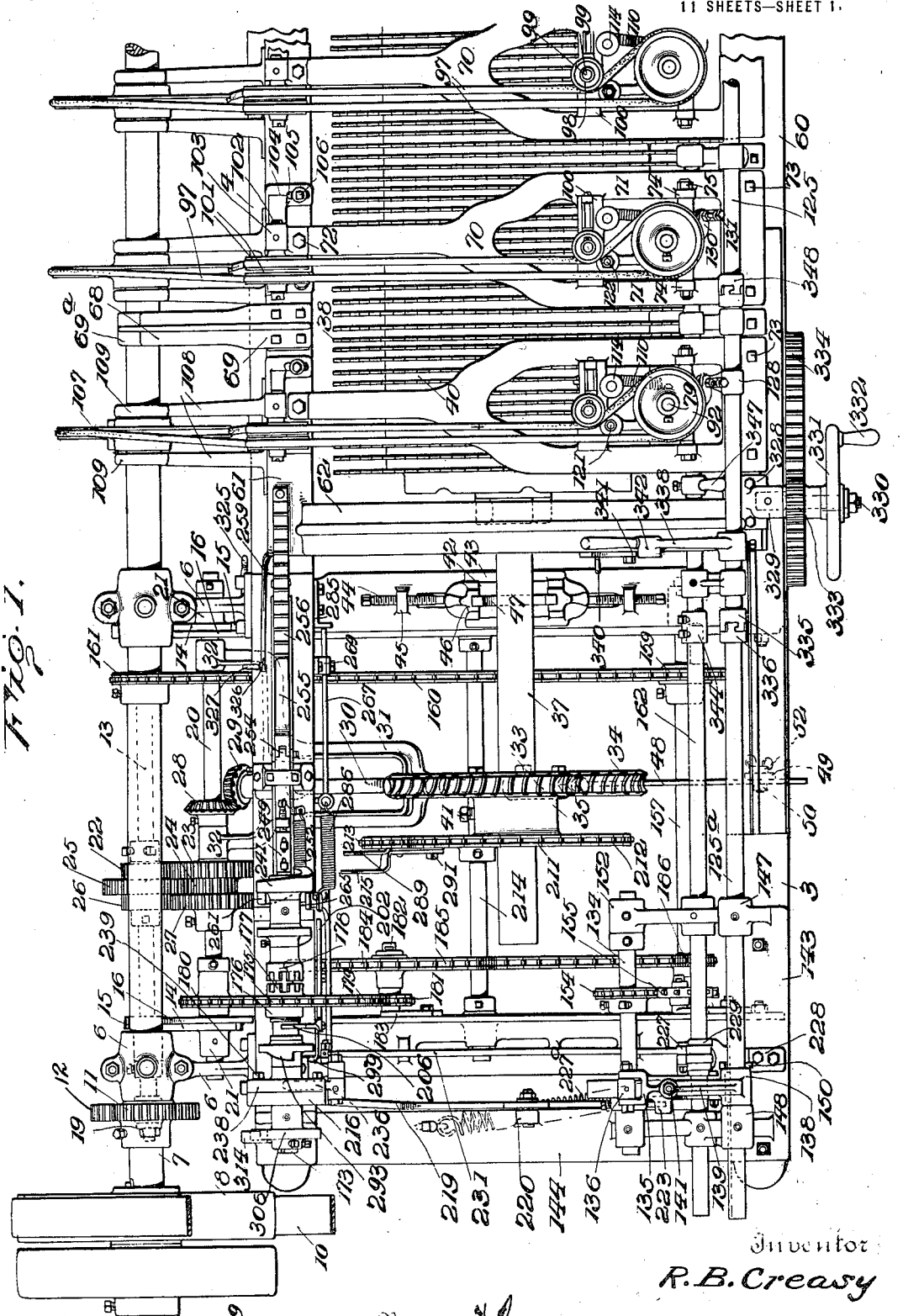
Figure 1 is a top plan view of the left hand end of the machine, or in other words, that end thereof at which the operating and controlling mechanisms for the files and saws are located.
Figure 5:
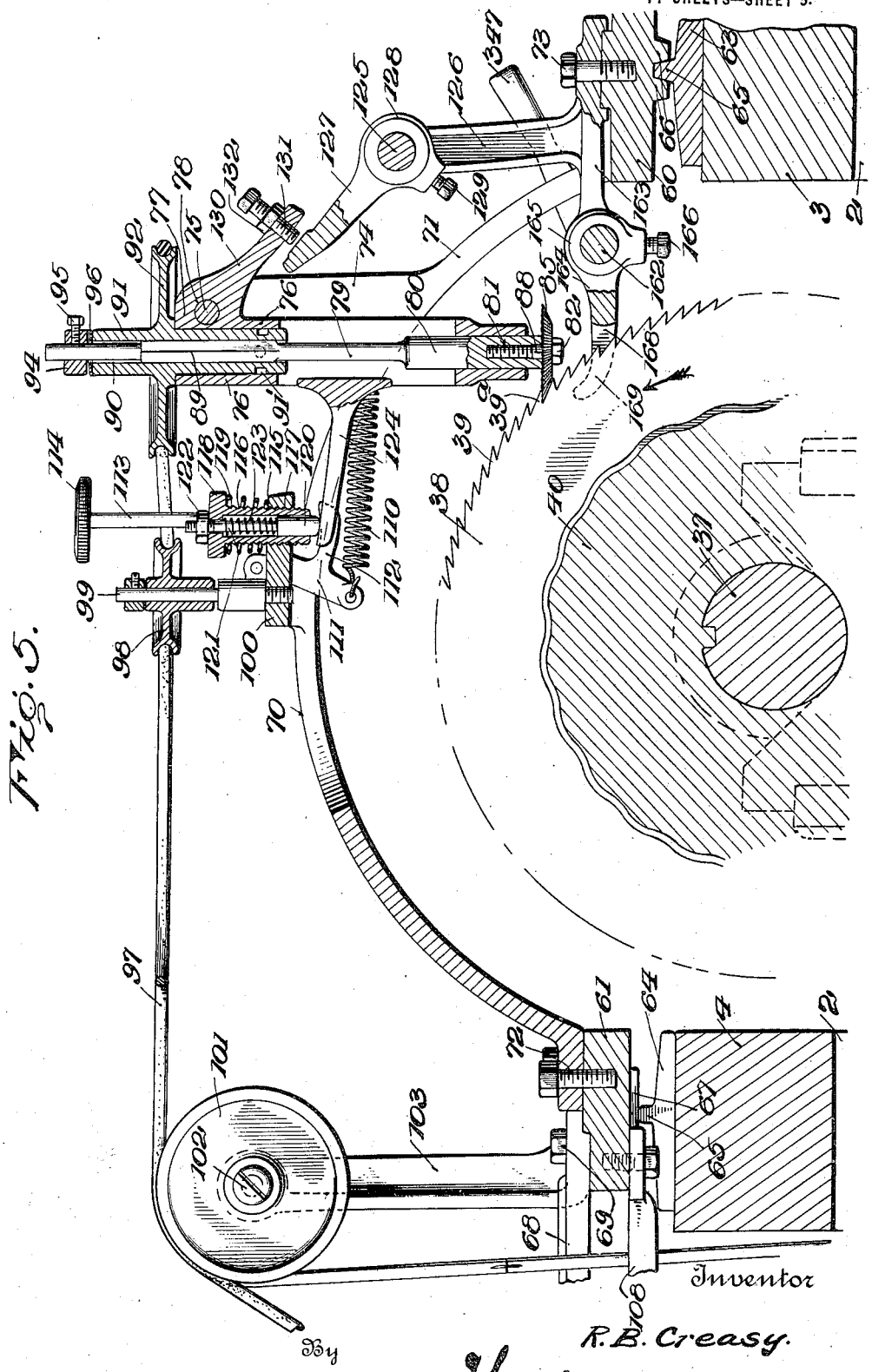
Fig. 5 is a detail vertical sectional view through one of the file carriages and its associated parts, the file being shown in filing engagement with the teeth of the saw being sharpened.

The mechanism embodying the invention is mounted upon a suitable frame structure incluling front and rear sills 1 which support uprights 2 which in turn at their upper ends support front and rear head beams, indicated by the numerals 3 and 4, respectively. The front and rear sections of the frame structure are connected and relatively braced by suitable cast frames 5. Journaled in suitable bearing brackets 6 upon the rear side of the supporting frame structure is the drive shaft of the machine, indicated by the numeral 7, this shaft extending the entire length of the frame structure and being the shaft from which the file spindles are driven and from which power is communicated to various other shafts of the several mechanisms of the machine. Fixed upon the shaft 7 at one end is a pulley 8 and also mounted upon the shaft beside the pulley 8 is a loose pulley 9, a belt 10 being passed about these pulleys and being shiftable from one to the other for the purpose of starting and stopping the machine. As heretofore stated, means is provided for atuomatically stopping the machine after the last saws of the several sets have had all of their teeth properly filed and this means is embodied in a device for at such time automatically shifting the belt 10 from the fixed pulley 8 to the loose pulley 9 and will be presently specifically described. Fixed upon the shaft 7 near the pulley 8 is a gear 11 which meshes with a gear 12 which is fixed upon one end of a shaft 13 mounted in suitable bearing blocks 14 slidably adjustably disposed between guide ribs 15 upon outstanding bracket plates 16 which are mounted upon and extend rearwardly from the uprights 2 at one end of the rear of the machine. Adjusting screws 17 are threaded through bosses 18 upon the plates 16 and by rotating these screws the bearing blocks 14 may be raised or lowered so that various sizes of the gear 12 may be mounted upon the shaft 13 and caused to mesh with the gear 11, the purpose of this adjustment being to provide for the adaptation of the machine to act upon saws having various numbers of teeth. As before stated, the gear 12 is fixed upon the end of the shaft 13 and is held in place by means of a nut 19 which may be loosened and removed to permit of the removal of one of the gears 12 and the substitution therefor of another one of the gears of a different size. From the shaft 13, power is to be transmitted at a reduced rate of speed to a shaft 20 which is also mounted at its ends in suitable bearings 21 upon the bearing blocks 14, as clearly shown in Fig. 1 of the drawings. In order that power may be transmitted, as stated, at a reduced rate of speed from the shaft 13 to the shaft 20, there is provided a system of reduction gearing which includes a gear 22 fixed upon the shaft 13 and meshing with a larger gear 23 loosely mounted upon the shaft 20. A smaller gear 24 is integral with or connected for rotation with the gear 23 and meshes with a larger gear 25 loosely mounted upon the shaft 13 and having integral with it a smaller gear 26 which meshes with a larger gear 27 fixed upon the shaft 20. From the shaft 20 power is to be transmitted at a further reduced rate of speed to a worm gear which is to directly drive the gin saw shaft carrying the gin saws and in order that this may be accomplished a beveled gear 28 is fixed upon the shaft 20 and meshes with a beveled gear 29 fixed upon one end of a shaft 30 mounted in a suitable yoke frame 31 having terminal bearings 32 which loosely fit the shaft 20 whereby to provide for angular adjustment of the yoke frame about the shaft 20 as an axis without disconnecting the gears 28 and 29. At its inner end the shaft 30 is provided with a worm 33 which in the operation of the machine, meshes with a worm gear 34 having a hub 35 provided with an opening 36 through which is to be fitted one end of the shaft supporting the gin saws to be sharpened. This shaft is indicated by the numeral 37 and is the shaft as removed from the gin, the saws being indicated by the numeral 38, and their teeth by the numeral 39. The saws are spaced apart with relation to each other by means of suitable spacing disks 40 arranged upon the shaft between the said saws. A set screw 41 is threaded through the hub 35 of the worm gear 34 and is designed to be tightened to bear against the shaft 37 for the purpose of securing the said worm gear upon the said shaft at the proper point thereon. It will now be understood, that being suitably supported, the shaft 37 is driven at a low rate of speed from the drive shaft 5 through the gearing previously described and that this drive is constant. As will be observed by reference to the arrow in Fig. 5 of the drawings, the shaft is rotated in a direction opposite that in which the teeth 39 are pointed, or in other words, in a direction the opposite to that in which it is rotated in the gin. It will also be understood that the worm gear 34 is to be applied to the shaft 37 prior to disposing the shaft and the saws carried thereby within the machine for sharpening of the saws and that after such disposal the gear may be adjusted so as to properly mesh with the worm 33 and then secured in place by means of the set screw 41. In order to support the shaft 37 for rotation within the machine, suitable adjustable bearings are mounted upon the supporting frame structure and each of these bearings includes a base 42 mounted for adjustment in a front to rear direction between suitable guides 43 and adjusted through the medium of screws 44 which are threaded through bosses 45 upon the frame and bear against the opposite ends of the said base 42. The base 42 has upstanding guides 46 and mounted for vertical adjustment within these guides is a bearing plate 47 recessed to receive the shaft 37. An adjusting screw 48 is threaded up through the frame and bears at its upper end against the under side or lower edge of the plate 47 and may be adjusted to raise or lower the said plate. The adjustability of the bearings for the shaft 37, just described, provides for proper centering of the shaft 37 and proper positioning of the saws 38 with relation to the files of the machine. As before stated, the yoke frame 31 is angularly adjustable about the shaft 20 so that the worm 33 may be brought into mesh with the worm gear 34 and in order that the frame may be swung upwardly for this purpose, a lever 48 extends upwardly from the said frame and beside an upright bar 49 arranged within the front of the supporting frame structure and passed through this lever is a bolt 50 which works in a slot 51 formed in the said bar 49 upon which bolt is fitted a wing nut 52 which may be tightened for the purpose of securing the lever at adjustment.

In order to prevent longitudinal shifting or displacement of the shaft 37 after having been properly arranged within the machine and upon its bearings, an arcuate bridge member 53 is mounted to extend between the ends of the head beams 3 and 4 at the right hand end of the machine and is formed with a boss 54 upon which is slidably adjustably disposed a plate 55 held at adjustment by means of a bolt 56 which fits through a slot 57 in the said plate and is secured in place by means of a wing nut 58. The inner end of the plate is turned downwardly to form an abutment 59 which is designed to bear against the adjacent end of the shaft 37 for the purpose stated.

As heretofore pointed out, the file carriages of the machine are mounted upon a supporting frame and this frame includes front and rear members indicated by the numerals 60 and 61, respectively, connected by bridge members 62 located near the ends of the said frame, the bridge members being bowed upwardly so as not to in any way interfere with the adjustment of the frame with relation to the saws. In order that the frame just described may be supported for movement longitudinally upon the main supporting frame structure, rails 63 and 64 are mounted, respectively, upon the head beams 3 and 4 of the said supporting frame structure and each has an upstanding rib 65 which is relatively narrow. The frame member 60 is formed or provided upon its under side with spaced depending ribs 66 which straddle the ribs 65 upon the rails 63 and provide for sliding of the said frame member 60 upon the said rail 63 and yet prevent backward or forward displacement of the parts. In a like manner the frame member 61 is provided upon its under side with a boss 67 which slidably rests upon the upper edge of the rib 65 upon the rail 64. It is preferable that two of the rails 63 be provided, one located adjacent each end of the head beam 3 and that a single one of the rails 64 be provided and located opposite but in position between the rails 63 so that the frame which supports the file carriages will be afforded support at three points and will therefore be steadier than if the rails 63 and 64 extended the entire length of the respective head beams. As it is intended that the frame which supports the file carriages shall be adapted to be swung upwardly about the shaft 7 as a center in order to permit of the introduction and removal of the shaft 37 and the saws supported thereby, bracket arms 68 are secured, as at 69, at suitable intervals to the upper side of the frame member 61 and extend rearwardly and downwardly and at their outer ends are provided with yokes 69$^a$ which fit over the said shaft 7.

In the machine as illustrated in the drawings, there are seven of the file carriages and the file supported by each carriage is designed to file, in the operation of the machine, the teeth of a series of saws, the total number of all of the series of which saws is a multiple or slightly more than a multiple of the number of carriages. For example, the machine may be adjusted so that each file will act upon a series of fourteen or fifteen saws although this number is wholly arbitrary as the machine may be adjusted to adapt each file to act upon a greater or less number of saws. If, after calculation and proper adjustment of the machine, it is found that there are one or more saws in addition to the number which is a multiple of the number of files, these surplus saws may be separately filed in a manner which will presently be fully explained. While in the illustrated embodiment of the invention there are seven files, it will be understood that this number may be increased or diminished. Each saw carriage includes an arcuate body which at its forward side has spaced portions 71 upon and between which the file and its supporting spindle and the bearing therefor and the parts associated therewith are mounted and arranged. At its rear side the body 70 is narrow and secured at its end, as at 72, upon the upper side of the frame member 61, the ends of the spaced portions 71 being integrally connected and secured, as at 73, upon the frame member 60. Extending upwardly from the spaced portions 71 of each file carriage are bosses 74 and fitted through the upper ends of the bosses and extending between the same is a bolt 75 which serves as a pivot for the bearing for the file spindle. The said bearing is in the nature of a sleeve 76 which is provided at its upper end with a transverse head 77 having a bore 78 which receives the pivot bolt 75, the sleeve being in this manner supported for oscillation. The spindle for the file is indicated in general by the numeral 79 and at its lower end is increased in diameter and exteriorly cylindrical, as at 80, there being a threaded socket 81 formed in the said lower end of the spindle to receive the shank of a securing bolt 82 designed to hold the file to the spindle. The file is of the circular rotary type and comprises a body 83 having its upper surface at its periphery slightly beveled, as at 84, and roughened to form a filing surface and having its under side at its periphery more sharply beveled, as indicated at 85 and also roughened to form a filing surface. Axially the body 83 is formed with an opening 86 the wall of which is recessed at diametrically opposite points, as at 87, and the shank of the bolt 82 fits through the opening 86 and the recesses 87 receive lugs 88 which project upwardly from the head of the bolt 82 at opposite sides of the said shank. Thus when the bolt 82 is tightened in the socket 81 after the file has been properly applied to the bolt, the file will be securely held in place and against rotation with relation to the spindle. Above its portion 80 and below its upper end the spindle 79 is formed with a squared portion 89 which fits within the squared bore 90 of the hub 91 of a pulley 92. The hub 91 of the pulley 92 extends both above and below the pulley and the lower portion of the hub is exteriorly cylindrical and is rotatably fitted within the bore 93 of the bearing sleeve 76. In order to prevent upward displacement of the hub of the spindle 92 within the bearing sleeve 76, a screw 76' is fitted through the said sleeve 76 and at its inner end seats within a groove 91' formed in the lower end of the hub 91. The portion 80 of the spindle 79 rotatably fits within the lower end of the bearing sleeve 76, as clearly shown in Fig. 5 of the drawings, and in order to support the spindle against downward movement within the bearing sleeve, a collar 94 is fitted upon the upper end of the spindle and secured in place by means of a set screw 95. As it sometimes happens that the teeth of gin saws become overturned at their ends it is desirable that some means be provided for permitting a slight downward yield of the file spindle so that when the file is brought into contact with such a tooth the file may lower slightly and engage the tooth without filing away too much of the point or wholly destroying the tooth. In order that this may be accomplished a distorted washer of resilient metal, indicated by the numeral 96 is disposed upon the upper end of the spindle 79 between the upper end of the hub 91 of the pulley 92 and the said collar 94. By reference to Fig. 5 it will be observed that the upper surface of the file 83 is spaced a short distance below the lower end of the bearing sleeve 76 so that the spindle may have an upward sliding movement within the bearing sleeve and the hub of the pulley 92. Thus when the bearing 76 is oscillated so as to bring the file 83 into filing engagement with the teeth of a saw, the beveled filing surface 85 of the file may ride against the upper edge of one of the teeth and as the spindle may have free vertical movement as above stated, the file may readily enter and adapt itself to the throat between the said tooth and the next adjacent tooth in the direction of rotation of the saw within the machine. Also, during the filing operation, the file may move upwardly as the saw is gradually rotated, although this movement is, in the actual operation of the machine, very slow and for only a very short distance. As concerns the spring 96 it will be readily understood by reference to Fig. 5, that if it were not for the provision of the said spring which permits of a slight downward yield of the file and its supporting spindle, and should the tooth indicated specifically by the numeral 39$^a$ in the said figure have its point turned downwardly the file would entirely cut away the down-turned point of the tooth or in all probability the tooth would be broken off or the file would be injured. As it is, however, the file may enter, under such circumstances, the throat of the tooth and yieldably contact the over bent point in a manner to gradually file the same to the required shape without any likelihood of injury to the tooth or to the file. In order that the file spindle may be rotated, a belt 97 is passed about the pulley 92 and has one stretch passed also about an idle pulley 98 mounted upon a spindle 99 which projects upwardly from a bridge piece 100 extending between the upper portions of the spaced members 71 of the file carriage. The stretches of the belt 97 are also passed over pulleys 101 mounted idly upon a spindle 102 at the upper end of an arm 103 supported upon and extending upwardly from the frame member 61. This arm, at its lower end, is provided with a base 104 formed with slots 105 through which are passed bolts 106 threaded into the said frame member 61. From the pulleys 101 the stretches of the belt 97 pass over a pulley 107 mounted upon the shaft 7 and so keyed thereon as to be slidable along the shaft and at the same time held for rotation therewith. It will now be understood that power is transmitted from the shaft 7 by the belt and pulley connection just described, to the file spindles and it will also be understood that by loosening the bolts 106, the arms 103 and the idle pulleys 101 supported thereby may be adjusted so as to tighten or slacken the belt 97 as may be found necessary. It will be understood, of course, that the structure above described is common to all of the file carriages and the files mounted thereon and in order that the pulleys 107 may be slidably adjusted in unison along the shaft 7 as the carriages and their supporting frame are adjusted, pairs of arms 108 extend rearwardly and downwardly from the frame member 61 and at their lower ends are provided with collars or yokes 109 slidably and rotatably fitting the said shaft 7. In order that the bearing 76 may be oscillated upon the pivot bolt 75 so as to draw the respective file 83 into the throat of the tooth to be filed and in order that the file may be fed into the throat as the filing operation progresses, a spring 110 is connected at one end to the bearing sleeve 76 of the carriage 70 and at its other end to the lower end of a rock arm 111. The rocking movement of the arm 111 is limited by the engagement of a finger 112 upon the arm against the lower end of an abutment screw 113 which is adjustably threaded through the bridge piece 100 and at its upper end is provided with a milled head 114 whereby it may be manually turned or adjusted. It will now be understood that the pull of the spring 110 upon the bearing sleeve 76 serves to oscillate this sleeve upon its pivot bolt 75 and to yieldably hold the file 83 in filing engagement with the tooth to be filed and that the said spring furthermore serves to feed the file into the throat of the tooth as the filing operation progresses, the beveled filing surfaces of the file causing the file to automatically adapt itself to the edges of the teeth within the throat so as to evenly and accurately file the said edges. Of course, by adjusting the abutment screw 114 the tension of the spring 110 may be varied so as to cause the file to more or less firmly engage the teeth during the filing operation. As a means for limiting the entrance of the file 83 into the throat of the tooth being filed and thus regulating the depth of the cut, and also as a means for cushioning the movement of the bearing sleeve 76 and absorbing vibratory shocks incident to such movement, there is provided a yieldable abutment and cushioning device which includes a screw having a hollow shank 115 which is exteriorly threaded, as indicated by the numeral 116 and adjustably fitted in an opening 117 in the bridge piece 100, the screw being provided at the upper end of its shank with a milled head 118 whereby it may be readily manually adjusted. A spring 119 is disposed to surround the shank of the said screw and bears at its upper end against the under side of the head 118 and at its lower end upon the under side of the bridge piece 100 and this spring prevents backward rotation of the said screw after it has been properly adjusted. Slidably fitted within the lower end of the bore of the hollow shank of the screw 115 is the head 120 of an abutment pin, the shank of which pin, indicated by the numeral 121, extends upwardly within the shank 115 of the said screw and through an opening in the head 118 of the screw, the upper end of the pin being threaded and having applied thereto a nut 122 which bears against the upper side of the said head and which may be adjusted to vary the tension of a spring 123 which is fitted upon the shank of the pin and bears at its lower end upon the shoulder of the upper end of the screw 115 and at its lower end against the upper end of the head 120 of the said pin. The lower end of the pin projects a short distance below the lower end of the shank 115 of the abutment screw and engaging the lower end of the said head 120 is the end of an arm 124 which extends forwardly from the bearing 76. It will be understood at this point that by adjusting the screw 115, the lower end of the said screw may be positioned more or less closely to the end of the arm 124 and also by adjusting the nut 122 the tension of the spring 123 may be varied so as to have a greater or less cushioning effect before the end of the arm 124 engages the lower end of the screw shank 115. Such engagement of the end of the arm 124 with the lower end of the screw shank will, of course, limit the depth of cut of the file into the throats of the teeth.

As heretofore stated, means is provided for automatically moving the files away from the saws as successive teeth are filed so that the saws may be free to rotate the distance of one tooth between each filing operation and in order that this may be accomplished there are provided a number of tappets which are mounted upon a shaft 125 which shaft is mounted for oscillatory movement in suitable brackets 126 upon the frame member 60. Each of these tappets is in the nature of a finger 127 having at its inner end a collar 128 secured by means of a set screw 129 upon the shaft 125, there being provided one of the tappet fingers 127 for each bearing 76. Each bearing 76 has a finger 130 projecting forwardly from its upper end substantially radial to the pivot bolt 75 and adjustably threaded through the end of this finger is an abutment screw 131 designed to be held at adjustment by means of a jam nut 132. The lower end of the screw 131 projects below the under side of the finger 130 and is designed to be engaged by the end of the respective tappet finger 127 when the shaft 125 is oscillated toward the forward side of the machine and the said fingers 127 are swung upwardly. Normally the end of the tappet finger 127 is spaced from the end of the respective abutment screw 131 so that the spring 110 will be free to control the feed of the file into the throats of the teeth. In order that the shaft 125 may be oscillated for the purpose of imparting oscillatory motion to the entire series of bearings 76 thereby automatically moving the files out of filing engagement with the respective saws after each tooth has been filed and as the saws are being rotated to bring the succeeding tooth into position for filing, a cam 133 is fixed upon a rotary shaft 134 which will presently be more specifically described and coacts with an oscillatory arm 135 which is provided at its outer end with an anti-friction roller 136 to engage the periphery of the cam. This arm 135 at its inner end is pivotally connected, as at 137, to a collar 138 which is keyed upon a section of the shaft 125 although this section of the shaft may have sliding movement through the said collar for a purpose to be presently explained. In order that the arm 135 may be held against swinging movement upon its pivot 137 and to impart oscillatory movement to the collar 138 and, consequently, to the shaft 125 as the cam 133 rides beneath the roller 136, a rigid arm 139 extends upwardly and thence rearwardly from the collar 138 and has adjustably fitted through its outer end a screw 140 having a hand wheel 141 at its upper end whereby it may be readily manually adjusted. The lower end of the screw 140 fits in a socket 142 in the upper side of the arm 135 and it will be understood that by reason of the presence of the screw 140 the arm 135 is held against upward swinging movement with relation to the arm 139 and consequently as the cam 133 is rotated and rides beneath the roller 136, oscillatory motion will be imparted to the arm 135 and communicated to the shaft 125. The adjustability of the screw 140 provides for variation in the relative angular positions of the arms 135 and 139 and this serves an important purpose as will be presently pointed out. As before stated, the ends of the tappet fingers 127 are normally slightly spaced below the lower ends of the abutment screws 131. However, as the cam 133 rotates, and in the ordinary filing operation of the machine this rotation is constant, the high point of the cam riding beneath the roller 136 will swing the arm 135 upwardly thereby rocking the shaft 125 so as to cause all of the tappet fingers 127 thereon to strike their respective abutment screws 131 and swing the respective bearings 76 forwardly so as to simultaneously move the files out of filing engagement with the teeth of the respective saws. Of course, when the files are so moved out of filing engagement with the saw teeth, the continued rotation of the saws will bring into position for filing the next succeeding tooth, and in the meantime the high point of the cam 133 will have passed the roller 136 thus allowing the arm 135 to swing downwardly and causing the tappet fingers 127 to lower, thereby allowing the springs 110 to again oscillate the respective bearings 76 to bring the files into filing engagement with the next succeeding tooth upon each respective saw. It will be understood that when the adjusting screw 140 is manipulated so as to swing the arm 139 upwardly in a direction away from the arm 135, the shaft 125 will be slightly turned so as to slightly swing the tappet fingers 127 in an upward direction and cause their ends to lie closer to the respective abutment screws 131 and that, on the other hand, when the screw 140 is adjusted in the opposite direction, or in other words, to permit the arm 139 to lower in the direction of the arm 135, the tappet fingers 127 will be swung downwardly to a greater or less extent. As a result of this adjustment, the positions of the tappet fingers 127 may be quickly simultaneously varied in accordance with variations in the diameters of the saws to be filed. Thus after having filed the saws upon one gin shaw shaft it may be desired to file the saws upon another gin saw shaft, which latter saws are of a greater or less diameter than the first-mentioned saws and by adjusting the screw 140 the machine may be readily adjusted to compensate for this variation in the diameters of the two sets of saws.

The shafts 125 and 134 are mounted in a bearing frame which includes a base 143 secured upon the left hand end of the forward head beam 3 and which has an integral arcuate bridge piece 144 which extends across the end of the supporting frame structure for the machine and is secured to the rear head beam 4. Extending upwardly from the base 143 are standards 145 and 146 provided at their upper ends, respectively, with bearings 147 and 148 in which is journaled the shaft 125. More specifically speaking, the said shaft 125 is formed in sections, as before stated, and these sections are connected by a suitable coupling, as will be presently specifically described, at a point near the standard 145 so that, as a matter of fact, it is the relatively short end section of this shaft, indicated in the drawings specifically by the numeral 125$^a$, which is journaled in the bearings 147 and 148, the shaft being supported for oscillation as well as for longitudinal sliding movement in the said bearings. As the collar 138 is keyed upon the shaft section 125$^a$ in such a manner as to be connected with the shaft for oscillation and yet permit of the shaft section sliding therethrough, a bracket 149 is secured upon the standard 146 and extends laterally therefrom and has an upturned forked end 150 which straddles the under side of the shaft section 125ᵃ and engages one end of the said collar 138, the other end of the collar abutting against the bearing 14 and the said collar being in this manner held against lateral displacement, together with the arms supported thereby, when the shaft section 125 is shifted. The standard 145 is provided with a rearward extension 151 having a bearing at its end indicated by the numeral 152, and in which bearing is journaled one end of the shaft 134, the other end of this shaft being journaled in a bearing at the upper end of a standard 153 which extends upwardly from the bridge piece 144. In the operation of the machine, the shaft 134 is driven constantly and in order that this may be accomplished a sprocket gear 154 is fixed upon the said shaft and has trained about it a sprocket chain 155 which chain passes also about a sprocket gear 156 fixed upon a shaft 157 journaled in a suitable bearing 158 in the lower portion of the supporting frame structure. Also fixed upon the shaft 157 is a sprocket gear 159 over which is trained a sprocket chain 160 which passes also over a sprocket gear 161 fixed upon the shaft 7. From the foregoing it will be seen that the shaft 134 is driven constantly from the shaft 7 of the machine.

As before stated, stabilizing members are provided and are movable into and out of engagement with the saws being filed, the purpose of the said members being to prevent vibration of the saws when being acted upon by the files and to hold the saws in a rigid manner so that the files may more effectually perform their function, the stabilizing members serving also as a means for slightly spreading or laterally displacing the saws at the opposite sides of a saw, the teeth of which are being acted upon by one of the files so that there will be no likelihood of side cutting or slashing of the teeth of the last-mentioned saws. These stabilizing members are mounted upon a shaft 162 which is journaled for oscillatory movement in suitable bearings 163 which extend rearwardly from the member 60 of the frame which supports the file carriages. Each of these stabilizing members, indicated in general by the numeral 164, comprises a collar 165 which is secured by means of a set screw 166 upon the shaft 162 and which is provided with a rearwardly extending arm 167 formed with a kerf 168 forming slightly spaced fingers 169. Each of the fingers 169 has a flat lateral face 170 and the lateral faces 170 of the said fingers are located in parallel planes and oppose each other and are spaced apart a distance substantially equal to the thickness of the saw to be filed so that when the arm 167 is swung into position with the fingers straddling the periphery of the saw, these faces 170 will engage the opposite faces of the saw and effectually hold the saw against vibration. These faces 170, of course, form portions of the walls of the kerf 168 and it is preferable that inwardly of the walls 170 the kerf be slightly increased in width so as not to bind the saw at the toothed edge thereof or in any way injure the teeth as the stabilizing member is swung into and out of engagement with the saw. The fingers 169 are each provided also with a flat face 171 which is presented outwardly and when the stabilizing member has been swung into engagement with a saw to be filed, these faces 171 of the fingers 169 will bear against the adjacent faces of the two saws at the opposite sides of the saw being filed so as to hold the last-mentioned saws out of position where they would be likely to be side slashed or cut by the file acting upon the saw engaged by the stabilizing member. In order that the fingers 169 of the stabilizing member may readily pass the periphery of the saw to be engaged and held against vibration, when the member is swung into such engagement with the saw, and also in order that the fingers may readily enter between this saw and the saws at the opposite sides thereof, the said fingers have their opposite sides beveled to a point at their ends, as indicated by the numeral 172, as clearly shown in Fig. 11. It will be understood, furthermore, at this point that the beveled ends of the fingers 169 serve, in effect, as wedges as they enter between the saws to be filed and the saws at the opposite sides thereof so that the last-mentioned saws will not be too suddenly spread away from the saw to be filed. While, as stated, the shaft 162 is mounted for oscillatory movement, this shaft is not constantly oscillated during the filing operation of the machine but, on the other hand, is only actuated to swing the stabilizing members out of engagement with the saws after the respective saws have had all of their teeth filed and immediately prior to the operation of the machine to shift the file carriages, it being again actuated to swing the stabilizing members into engagement with the next saws to be filed after the carriage has been shifted and immediately prior to resumption of the filing operation, and the means for automatically oscillating the shaft 162 at the periods mentioned will presently be specifically described.

Figure 7:
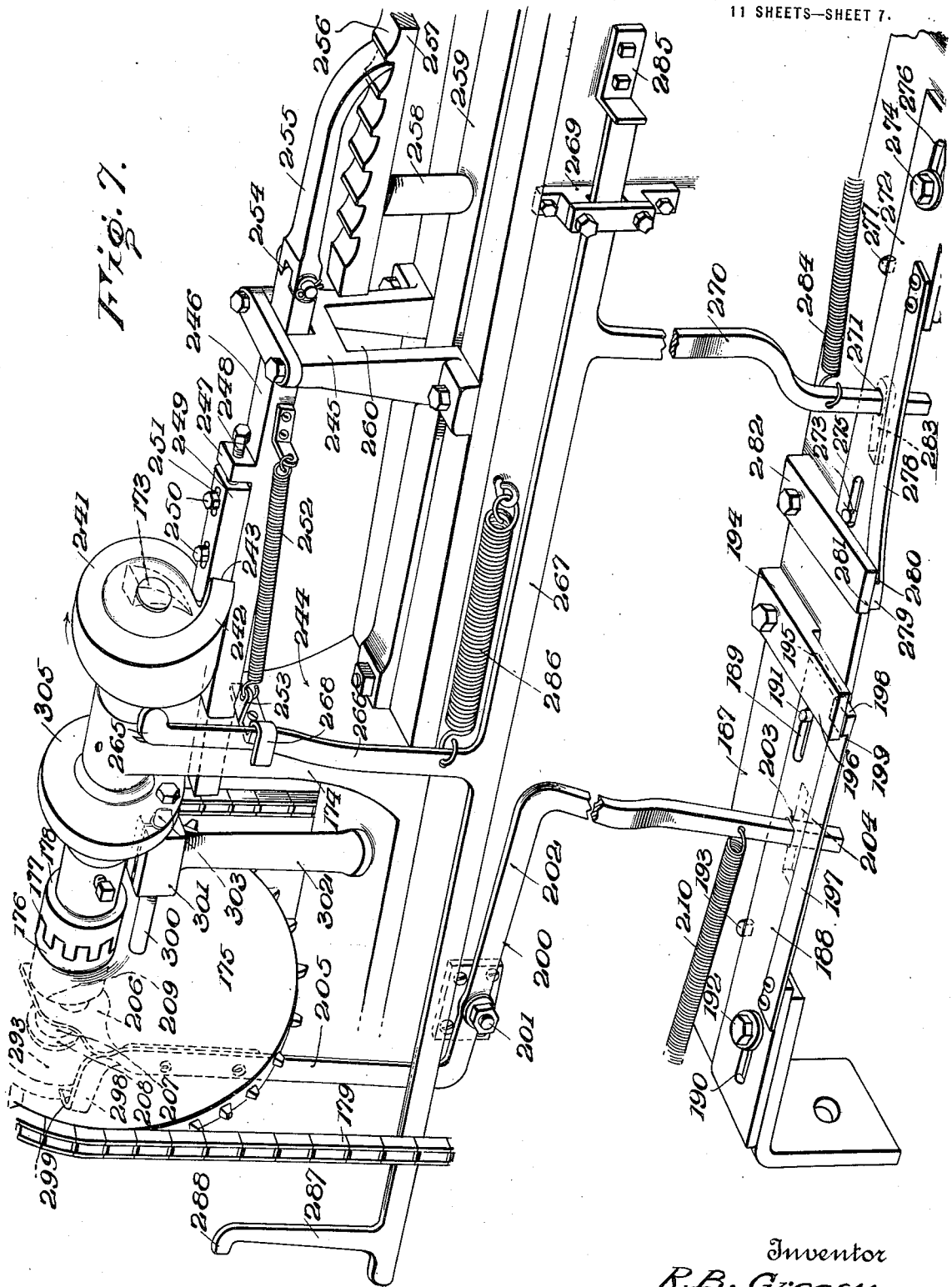
Fig. 7 is a perspective view illustrating the mechanisms provided for throwing in and out of operation the shaft which carries the several controlling cams of the machine, the mechanism for shifting the file carriages, and certain trip and resetting devices which will be hereinafter specifically described.

From the foregoing description it will be understood that the oscillation of the bearings which support the files is controlled during the filing operation of the machine through the constant rotation of the shaft 134 and the action of the cam 133 upon the arm 135 and that during the filing operation the shaft which carries the gin saws is constantly rotated in a backward direction, or in other words, in a direction opposite that in which it is rotated when in the gin, the files being successively swung into filing engagement with the teeth of the saws as the saws are rotated and after the filing of each tooth. More specifically, the files upon the several carriages are first simultaneously moved into filing engagement with the corresponding teeth upon corresponding saws of the several series into which the whole number of saws is theoretically divided and as the files engage the teeth they automatically adapt themselves to the throats of the teeth and follow up the teeth as the saw slowly recedes from the files, the files then being automatically moved away from the teeth which have been filed through the action of the cam 133 upon the arm 135 which causes upward swinging of the tappet fingers 127 and being again permitted to move into filing engagement with the next succeeding teeth of the respective saws after the saws have been rotated substantially the distance of one tooth whereupon the filing operation is repeated. As before pointed out when all of the teeth upon the corresponding saws of the several series have been filed it is necessary that the file carriages be shifted so that the files may act upon the corresponding saws which occur next in the several series and during this shifting of the file carriages it is essential that the means for oscillating the files be rendered inactive and that the files be held, during such shifting of the carriages, entirely away from the saws. This particular means, the means for also moving the stabilizing members 164 out of engagement with the saws during the shifting movement of the carriages, and the means for shifting the carriages are all controlled through the medium of certain cam and trip devices which will now be described. All of the controlling cams are mounted upon a single shaft which is idle during the filing operation of the machine and is only brought automatically into action when all of the teeth upon the corresponding saws of the several series have been filed and it becomes necessary to shift the file carriages to the next succeeding saws in the series. The shaft, above mentioned, is indicated by the numeral 173 and is rotatably mounted in suitable bearings 174 upon the rear head beam 4 of the supporting frame structure. A sprocket gear 175 is mounted upon a hub 176 which is loosely mounted upon the shaft 173 and which hub at one side has a clutch face 177 designed, when the hub is shifted under conditions to be presently explained, to engage the face of a clutch member 178 fixed upon the said shaft. A sprocket chain 179 is trained over the gear 175 and passes over an idler sprocket 180 loosely mounted upon the shaft 20. The chain 179 passes also about a sprocket 181 rotatably mounted upon a stub shaft 182 carried by a bracket arm 183 mounted within the supporting frame structure. The sprocket 181 rotates with a sprocket 184 upon the said stub shaft 182 and trained over the sprocket 184 is a sprocket chain 185 which passes also over a sprocket gear 186 fixed upon the shaft 157. As the shaft 157 is driven constantly from the drive shaft 7 of the machine through the sprocket gears 161 and 159 and sprocket chain 160, constant rotary motion will be imparted to the sprocket gear 175 through the system of gearing just described although this motion will not be imparted to the shaft 173 until the gear 175 has been shifted to bring the clutch faces 177 and 178 into mutual engagement. The sprocket gear 175 is shifted for the purpose stated through the medium of a trip device which includes a supporting base 187 mounted between two of the uprights 2 at the rear of the machine. Slidably disposed upon the base 187 is a trip plate 188 having slots 189 and 190 formed therein, the base 187 being provided with a stud 191 which projects up into the slot 189 to guide that end of the plate 188 adjacent which the said slot 189 is located. A cap bolt 192 is fitted through the slot 190 and into the base 187 and serves to guide the opposite end of the said plate 188. A flat-sided stud 193 also projects upwardly from the base 187 and engages one longitudinal edge of the plate to further guide the same in its sliding movement. A keeper block 194 is fixed upon the base 187 and has its under side recessed, as at 195, to form a lip 196 which extends above the inner end of the plate 188, this end of the plate sliding beneath the said lip as will be readily understood by reference to Fig. 7 of the drawings. A leaf spring latch 197 is fixed at one end upon the upper face of the plate 188 and the outer edge of the said plate is recessed or cut away beneath the latch so as to permit of the latch being sprung downwardly. At its free end the latch is provided with a head 198 forming a shoulder 199 designed to engage behind one edge of the lip 196 of the keeper block 194 for the purpose of holding the plate 188 against sliding movement in a direction longitudinally of the base 187 and away from the keeper block 194. A rock lever, indicated in general by the numeral 200, is mounted for rocking movement, as at 201, upon the frame of the machine and this lever has an arm 202 extending laterally from the pivot 201 and thence downwardly, the lower end of the arm fitting loosely through an opening 203 formed in the trip plate 188, and through a slot 204 formed longitudinally in the base 187. At the other side of its pivot 201 the rock lever has an arm 205 which extends laterally and thence upwardly and at its upper end supports a yoke 206 which engages a reduced cylindrical extension 207 upon the hub 176 for the sprocket gear 175. This extension 207 at its end is provided with a collar 208. When the shaft 173 is idle and during the filing operation of the machine, the yoke 206 rests against a shoulder 209 formed at the inner end of the reduced portion 207 of the hub 176 and it will be understood, of course, that when the rock lever is swung so as to move the arm 205 in the direction of the gear 175, the gear will be shifted upon the shaft 173 so as to bring the clutch face 177 into engagement with the face of the clutch member 178. A spring 210 is connected at one end to the arm 202 of the rock lever and at its other end to an adjacent fixed portion of the frame of the machine and this spring at all times exerts a pull upon the arm 202 tending to swing the rock lever so as to shift the gear 175 to clutch the same with the shaft 173. However, when the trip plate 188 is shifted to position with the latch 197 engaging the lip of the keeper block 194 the lever 200 will be restrained against movement to cause shifting of the sprocket 175. However, it will be understood that should the head end 198 of the latch 197 be depressed so as to disengage the shoulder 199 upon the lip 196 of the keeper block, the trip 188 would be released and through the influence of the spring 210 would be slid to the left, as illustrated in Fig. 7 of the drawings, and this would, of course, result in rocking the lever 200 to shift the sprocket gear 175 so as to clutch the same with the shaft 173. In order that the latch may be tripped to accomplish the result stated, means is provided which will now be described. A sprocket gear 211 is integral with the hub 35 which hub, as heretofore described, is to be fixed upon the gin saw shaft 37 and trained about this sprocket is a sprocket chain 212, this chain passing also about a sprocket gear 213 which is fixed upon a shaft 214 mounted in suitable bearings within the frame of the machine. The sprocket 213 is of greater diameter than the sprocket 211 and consequently the sprocket 213 makes fewer revolutions than the sprocket 211 in any given period of time. Fixed upon this sprocket 213 is a trip finger 215 which projects beyond the periphery of the said sprocket 213 and which, at a predetermined point in the rotation of the sprocket 213, is designed in traveling downwardly, to strike the head end 198 of the latch 197 to trip the said latch and disengage the same from the keeper block 194. Thus when the machine has been properly adjusted and during the filing operation, the sprocket 213 will be gradually rotated until all of the teeth upon one saw of each series have been properly filed at which time the trip finger 215 will engage the end of the latch 197 disengaging the latch from the keeper block 194 and permitting the spring 210 to act to rock the lever 200 and shift the sprocket gear 175 into clutch with the shaft 173, which will set in motion the said shaft through the system of gearing heretofore described.

The shaft 173 having been set in motion in the manner above described, the results to be accomplished before shifting of the file carriages are, first, the movement of the files away from the saws and entirely clear thereof, and, second, the movement of the stabilizing members out of engagement with the saws. To accomplish the first result above mentioned, a cam 216 is fixed upon the shaft 173 and this cam which is clearly shown in Figs. 8 and 16 of the drawings, has substantially three quarters of its periphery concentric to the shaft 173 and has the other quarter of its circumference of cam formation, the high point of the cam being indicated by the numeral 217 and the low point by the numeral 218. The numeral 219 indicates a rock arm which is pivotally mounted, as at 220 upon the bridge piece 144, and rearwardly of its pivot the arm 219 is extended beneath the cam 216 and has its end turned upwardly to form a finger 221, which in the initial position of the parts, engages the lower point 218 of the cam. Forwardly beyond its pivot 220 the arm 219 is extended beside the cam 133 and has its end turned upwardly, as at 222 and engaging beneath a lateral lip 223 upon one side of the arm 135. It will now be understood that in the first quarter of revolution of the shaft 173, the active portion of the cam 216 between the low and high points of the said cam will cause the rear end of the arm 219 to be depressed or swung downwardly whereupon the forward end thereof will be swung upwardly and due to the engagement of the last-mentioned end beneath the lip 223 upon the arm 135, the said arm 135 will be swung upwardly, thus elevating the roller 136 above the path of movement of the high point of the cam 133 so that while this cam continues to rotate it will not act upon the said roller to move the arm 135. Of course, in this upward swinging movement of the arm 135 the tappet fingers 127 will swing the bearings 76 forwardly so as to move all of the files clear of the saws.

The shaft 162 is formed in two sections, one of which is a relatively short end similar to the section 125ᵃ of the shaft 125 and indicated by the numeral 162ᵃ, this section being slidably and rotatably journaled in suitable bearings 224 and 225 upon the bearing frame which supports the shafts 134 and 125ᵃ. Keyed upon the shaft section 162ᵃ is the collar 226 of a crank arm 227, the collar being so connected with the shaft as to rock therewith but in a manner to permit of the shaft sections sliding through the collar. In order to hold the collar and, consequently, the rock arm 227 against sliding movement with the shaft, a bracket 228 is fixed upon the base 143 and has a yoke 229, the arms of which extend over the shaft section 162ª at opposite sides of the said collar 226. Pivotally connected to the crank arm 227, as at 230, is one end of a connecting rod 231, the other end of which rod is pivotally connected, as at 232 to the lower end of one arm 233 of an angle lever mounted for oscillatory movement upon the stub shaft 234 which extends from a bracket 235 fixed upon the frame of the machine. The other arm of the angle lever, indicated by the numeral 236, extends rearwardly and normally engages the low point 237 of the periphery of a cam 238 which is fixed upon the shaft 173 beside the cam 216. In fact, it is preferable that the cams 216 and 238 be rigidly connected together, as for example, by means of bolts 239. The lifting face of the cam 238 is indicated by the numeral 240 and extends throughout substantially one quarter of the circumference of the cam. Thus in the first quarter of revolution of the shaft 173 not only will the files be moved clear of the saws, but also the angle lever just described will be rocked so as to oscillate the shaft 162 and cause the stabilizing members to swing downwardly and clear of the saws. The movement of the crank arm 227 under the thrust of the rod 231 is yieldably resisted by a spring 227ª which is connected to the said arm and to a fixed portion of the frame of the machine, it being understood that the pull of this spring tends to so rock the arm and the shaft 162 as to swing the stablizing members toward and into engagement with the saws.

As subsequent to the operations above described both the files and the stabilizing members are clear of the saws, the file carriages may be shifted and the means for accomplishing this result will now be described. Fixed upon the shaft 173 is a cam 241 having a spiral cam face 242 which terminates abruptly at its high point, as indicated by the numeral 243, the said cam face at its low point merging with the flat face of the cam body. The said cam face 242 extends throughout substantially one quarter of the circumference of the side of the cam and in the initial position of the cam 241 occupies the position shown in dotted lines in Fig. 18 of the drawings. The base which supports the bearing standards 174 is provided with upstanding bearings 244 and 245 in which is slidably mounted a bar 246 formed with an upstanding lug 247 through which is threaded an adjusting screw 248. The end of the screw 248 bears against one end of an abutment block 249 which is held for sliding adjustment upon the upper side of the bar 246 by means of bolts 250 which are fitted through slots 251 in the said block and are adjustably threaded into the bar 246 at their lower ends. The other end of the abutment block 249 engages that face of the cam 241 upon which the spiral cam portion 242 is formed and is held in such engagement by means of a spring 252 connected at one end to the bar 246 and at its other end to a bracket 253 upon the bearing 244. It will be understood, of course, that as the cam 241 is rotated the spiral cam portion 242 will ride against the last-mentioned end of the abutment block 249 and will shift the block and the bar 246 supporting the same longitudinally in the bearings 244 and 245 and against the tension of the spring 252, the bar 246 being, however, immediately returned by the spring to normal position as the high point 243 of the cam portion 242 passes the end of the abutment block 249. The outer end of the bar 246 has pivoted to it, as at 254, the inner end of a pawl 255, the free end of which pawl rests in engagement with the teeth 256 of a rack bar 257 which rack bar extends laterally from one end of the member 61 of the frame which supports the file carriages. While the rack bar 257 is rigidly secured upon the frame member 61 its outer or free end is additionally supported by means of a short post 258 which is integral with or secured to the under side of the bar and at its lower end slidably rests upon a smooth track 259 mounted upon the base upon which the bearings 244 and 245 are supported, the bearing 245 being recessed or cut away, as at 260, to permit of the rack bar 257 and its supporting post 258 passing the said bearing. From the foregoing it will be understood that as the shaft 173 is rotated and as the working surface of the cam portion 242 rides against the abutment block 249, the bar 246 will be shifted, corresponding movement being imparted to the frame supporting the file carriages, through the medium of the pawl 255 and rack bar 257. Of course, as the high point 243 of the said cam portion 242 passes the end of the abutment block 249, the spring 252 will immediately act to retract the bar 246 thus permitting the end of the pawl 255 to ride over the next succeeding tooth of the rack bar 257. Each shifting of the file carriage supporting frame through the medium of the pawl and rack just described, is for a distance substantially equal to the distance between any two of the saws upon the gin saw shaft and it will be understood from the foregoing and particularly by reference to Figs. 16, 17 and 18 of the drawings that this shifting operation takes place in the second quarter of revolution of the shaft 173 and after the files and stabilizing members have been moved clear of the saws.

Figure 6:
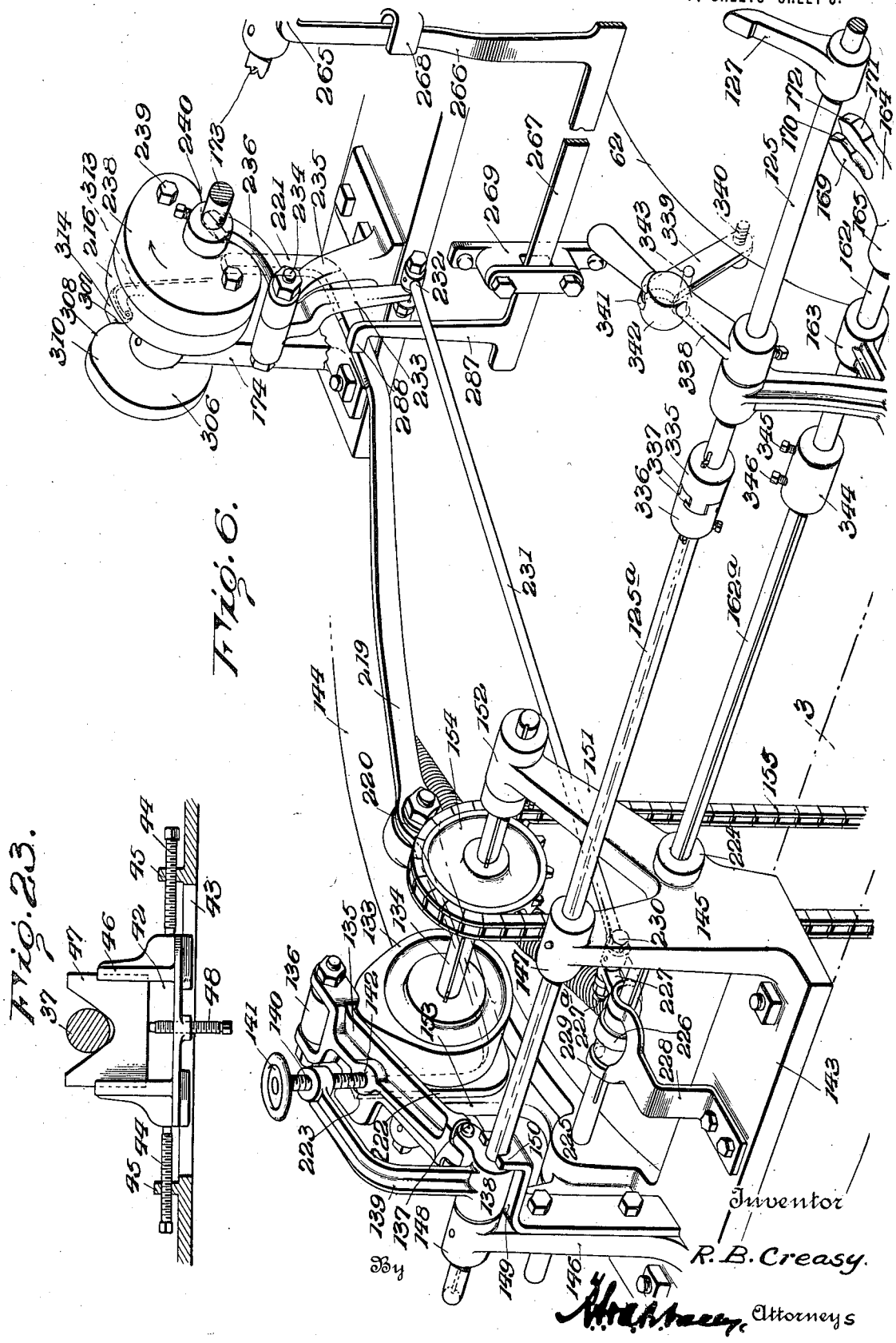
Fig. 6 is a perspective view illustrating the mechanisms provided for moving the files into and out of filing engagement with the saws, for rendering the file spindle bearing oscillating means inactive while the file carriages are being shifted, and for moving the stabilizing members into and out of engagement with the saws.

In the third quarter of revolution of the shaft 173 there are two operations which take place, namely, the resetting of the trip plate 188 and the bringing into action of a means provided for holding the lever arm 219 against return to normal position which would permit lowering of the arm 125 and the return of the files to filing engagement with the teeth of the saws. The cam 241 is provided upon its other face with a spiral cam portion 261 having a cam surface 262, the low point of which is indicated by the numeral 263 and the high point by the numeral 264. This cam portion 261 initially occupies the position shown in full lines in Fig. 18 of the drawings and acts in the third quarter of revolution of the shaft 173. The active surface of the cam portion 261 is designed to act against a head 265 at the upper end of an arm 266 which extends upwardly from a sliding bar 267 and which is guided by an extension 268 from the bracket 243 heretofore described. The bar 267 is mounted for sliding movement in suitable bearings 269 upon the frame of the machine and laterally beyond the arm 266 is provided with an arm 270 which extends downwardly opposite the arm 202 of the lever 200 heretofore described with its lower end fitting loosely through an opening 271 in a trip plate 272 which corresponds to the plate 188 and which is slidably mounted upon the base 187 and guided in its sliding movement by a pin 273 and cap bolt 274 fitting respectively in slots 275 and 276 formed in the said plate and by a flat sided guide pin 277 corresponding to the pin 193. A spring latch 278 is secured at one end upon the plate 272 and at its free end is provided with a head 279 having a shoulder 280 for engagement with the lip 281 of a keeper block 282 corresponding to the keeper block 194 and located beside the same, the heads 198 and 279 of the latches 197 and 278, respectively, being presented toward each other and located relatively close together. The lower end of the arm 270 extends into a slot 283 in the base 187 which slot corresponds to the slot 204 and permits of longitudinal movement of the end of the arm with relation to the base and corresponding movement of the trip plate 272. A spring 284 is connected at one end to the lower portion of the arm 270 and at its other end to a fixed portion of the frame of the machine, this spring tending to pull the arm and direct the arm to impart a pull upon the bar 267 in the direction of an abutment or stop 285 which is also fixed at a suitable point upon the frame of the machine and against which one end of the bar 267 is designed to strike when the trip plate 272 is released for sliding movement and the bar is slid through the influence of the spring 284. A spring 286 assists the spring 284 and is connected at one end to the lower end of the arm 266 and at its other end to the frame of the machine. At its end opposite the end which is located next the abutment or stop 285 the bar 267 is provided with an upstanding detent finger 287 with its upper end turned laterally to form a hook 288 designed to be engaged over the upper edge of the lever arm 219 when the arm has been rocked through the medium of the cam 216 so as to move the files clear of the saws. At the beginning of operation of the shaft 173 the trip plate 272 is in tripped or released position, it having been released through the engagement with the head 279 of the latch 278, of a trip finger 289, which is pivotally mounted upon the gear 213 beside the finger 215 and is angularly adjustable through the medium of a slot 290 formed therein and concentric to the pivot 291 for the said arm, and a set screw 292. In the stated position of the trip plate 272, the hooked end 288 of the detent finger 287 will be clear of the lever arm 219. However, as the cam 241 rotates and its cam portion 261 rides against the head 265 of the arm 266, the bar 267 will be shifted in a direction away from the abutment or stop 285 and to a position with the hooked end 288 of the said detent finger 287 engaging over the upper edge of the lever arm 219, as will be understood by reference to Fig. 6 of the drawings. The cam portion 261 of the cam 241 in shifting the bar 267 to bring the detent finger 287 into engagement with the lever arm 219, will reset the trip plate 272 by sliding the said plate longitudinally upon the base 187 in the direction of the keeper block 282 until the shoulder 280 has engaged behind the edge of the lip 281 of the said block and the parts will, by reason of this latch device, be held in this position until the latch 278 is again disengaged from the lip of the keeper block which takes place just after the completion of revolution of the shaft 173 and upon engagement of the trip finger 289 with the head 279 of the latch 278, the said trip finger 289 having been adjusted so as to accomplish this result at the proper period in the rotation of the shaft 173.

The means provided for resetting the trip plate 188 includes a cam 293 which is fixed upon the shaft 173 and which upon one of its faces is provided with a spiral cam portion 294 having a working face 295, the low point of which is indicated by the numeral 296 and the high point by the numeral 297. This cam is designed to act during the latter portion of the second quarter of revolution of the shaft 173 and through the greater portion of the third quarter of revolution of the said shaft and therefore substantially while the portion 261 of the cam 241 is acting. For coaction with the working portion 294 of the cam 293, the arm 205 of the rock lever 200 is provided at its upper end with a laterally extending finger 298 having its end bent, as at 299, to extend in the path of movement of the said cam portion 294. As the face 295 of this cam portion rides from its low point to its high point against the end 299 of the finger 298, the arm 205 will have its upper end swung in a direction away from the shoulder 209 of the hub 176, but as the reduced portion 207 is relatively long the yoke 206 will not act upon the hub to shift the sprocket 175 out of clutch with the shaft 173. The rocking of the lever 200 through the action of the cam 293 upon the finger 298 will result in the plate 188 being slid upon the base 187 against the tension of the spring 210 and in the direction of the keeper block 194 until the latch head 198 engages behind the lip of the said block. This trip mechanism is then in condition to be subsequently engaged by the finger 215 in the next operation of this portion of the mechanism. In the meantime the finger 279 has engaged the head 79 of the latch 278 so as to trip or release the plate 272 thereby withdrawing the detent finger 287 from engagement with the lever arm 219, thereby permitting this arm to return to normal position and allowing the arm 135 to swing downwardly, bringing the roller 176 again into engagement with the periphery of the cam 133 whereby the filing operation will be resumed and carried out as heretofore described, the files now, however, acting upon the unsharpened saws to position opposite which they have been moved in the shifting operation above recited.

Figure 4:
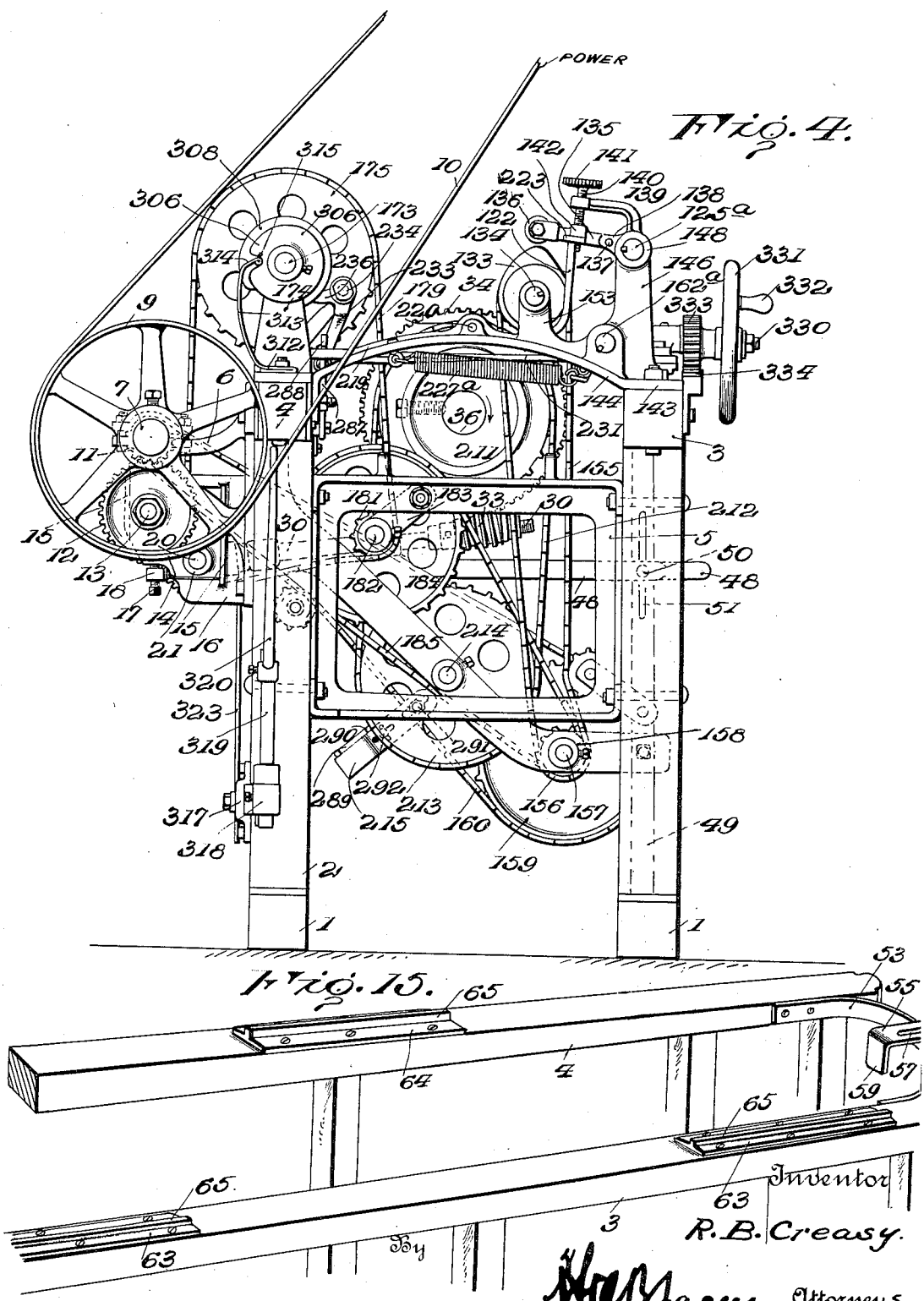
Fig. 4 is an end elevation of the machine.

As the shaft 173 has by this time when rotated substantially one complete revolution and the cams 216, 238, 241 and 293 have been properly rotated so as to shift the files and stabilizing members clear of the saws, to shift the file carriage frame, to return the stabilizing members to position between the saws, to return the files to working position, and to reset the trip plate 188, it is necessary that the clutch between it and the sprocket gear 175 be broken and that the rotative movement of the shaft be arrested at the proper point so that it will be in position for further operation after the unsharpened saws have had all of their teeth acted upon by the files. In order to accomplish the first result a shifting thrust pin 300 is slidably mounted in a head 301 at the upper end of a post 302 upon the base which supports the bearing 244 and one end of this pin is presented toward the sprocket gear 175 and is located relatively close to the face of the said gear and adjacent the hub thereof. The opposite end of the pin is beveled, as indicated by the numeral 303, and this end of the pin projects in the path of travel of an abruptly sloped working face 304 of a cam 305 which is fixed upon the shaft 173. The initial position of this working face 304 is clearly shown in Fig. 20 of the drawings and it will be apparent by reference to the said figure that the same comes into action near the end of the third quarter of revolution of the shaft 173 and, as above stated, after all of the cams above described have performed their several functions. As the working face 304 of the cam 305 rides against the beveled end 303 of the pin 300, the said pin will be shifted in the head 301 and exerting lateral pressure against the sprocket 175 will shift the sprocket and its hub 176 upon the shaft 173 until the clutch face 177 of the said hub has been disengaged from the face of the clutch member 178. The shaft 173 at this time would almost immediately cease to rotate were it not for the provision of some means for exactly completing its revolution and then positively arresting its rotary motion so as to leave it in precisely the proper position for actuation in the subsequent operation of the machine. The means for accomplishing this result includes a cam 306 which is fixed upon the shaft 173 and which has its periphery concentric to the said shaft except for a relatively narrow recess 307 which is formed in the said periphery of the cam. That wall of the recess 307 which is foremost in the direction of rotation of the cam is, clearly shown in Figs. 8 and 21 of the drawings, bulged or rounded, as at 308, so as to form a nose, the said wall of the recess at the inner end of the bulge 308 being reversely curved or sunken, as at 309. Thus the high point of the active surface of the cam 306 is located substantially at the point indicated by the numeral 310 and the low point is located substantially at the point indicated by the numeral 311. Secured at its lower end, as at 312, upon the base the which supports the bearings for the shaft 173, is a stout leaf spring 313 which projects upwardly and has its upper end curved over in the direction of the periphery of the cam 306 so as to form, in effect, a hook, indicated by the numeral 314 being rolled upon itself to form a cylindrical bearing end 315 which reduces the frictional contact between the portion 314 and the periphery of the cam. Fig. 21 of the drawings illustrates diagrammatically the initial position of the cam and this position is also substantially the final position of the cam for substantially with the unclutching of the shaft 175 from the shaft 173 the high point 310 of the cam 306 will be brought into engagement with the terminal 315 of the portion 314 of the resilient pull member 313 and due to the peculiar formation of the cam surface 308 and the inward pressure exerted by the said resilient pull member tending to seat its portion 314 in the recess 307, the said terminal 315 will ride over the cam surface and finally seat in the recess at the low point 311 of the said surface. In doing this the cam will be rotated a short distance carrying with it the shaft 173 and its motion will be positively arrested as soon as the terminal 315 seats in the low point of the cam surface, as clearly shown in Fig. 4 of the drawings.

Figure 2:
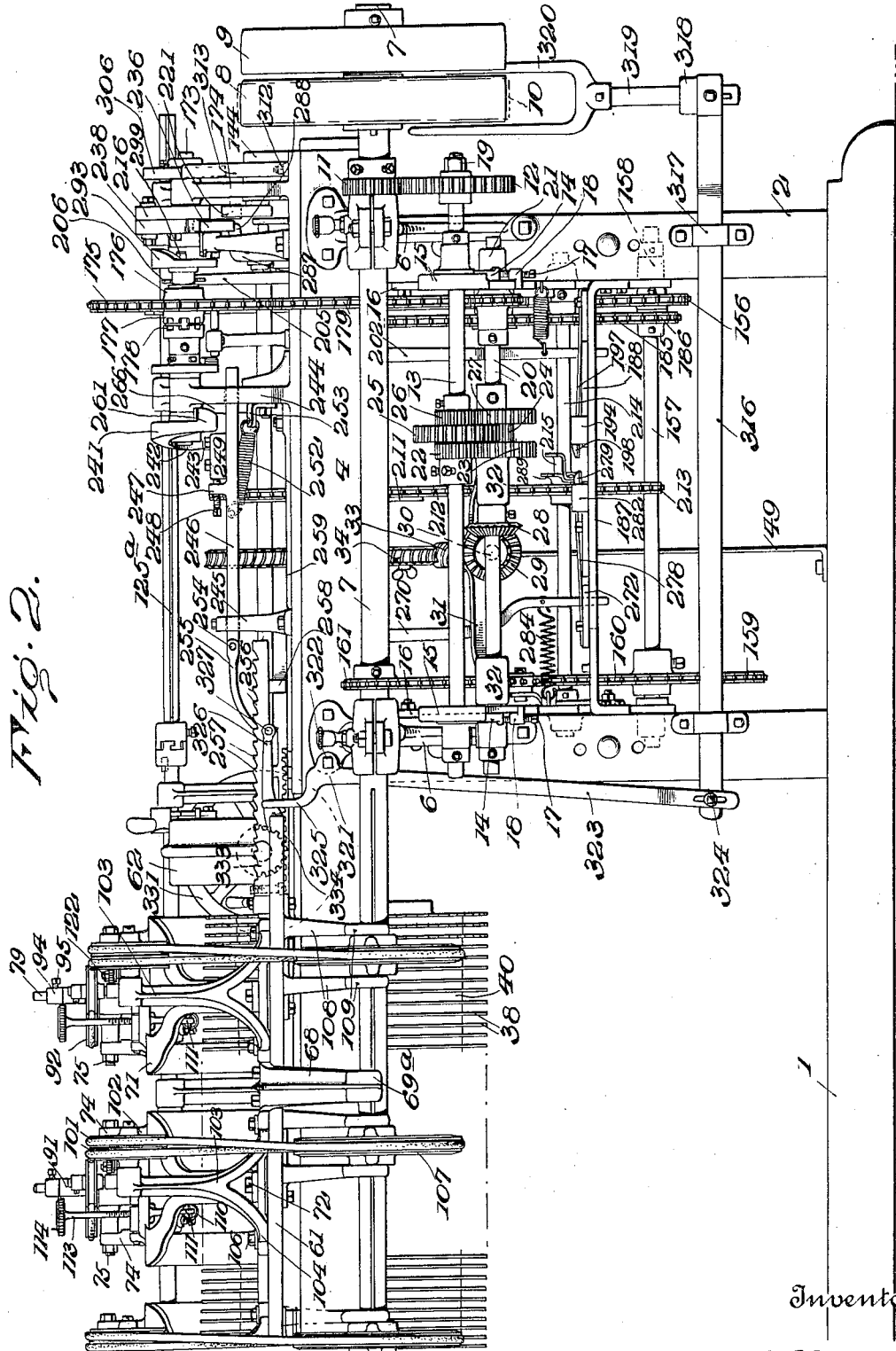
Fig. 2 is a rear elevation of the left hand end of the machine.

From the preceding description of the invention it will be understood that the entire number of saws to be sharpened is divided theoretically into a number of series, each of which embraces a predetermined and like number of saws. In the present instance it will be assumed that the gin saw shaft 37 supports one hundred and six saws. As there are seven file carriages and, consequently, seven files, and as one hundred and six is one greater than one hundred and five which latter number is a multiple of seven, each file, in the present instance, is designed to act upon a series of fifteen saws. At this point it may be stated that the odd or remaining saw is taken care of in a manner which will be presently fully described. Thus prior to starting the machine the file carriage supporting frame is racked back until the file of the first file carriage is opposite the second saw from that end of the bank of saws next adjacent the operating mechanism of the machine heretofore described whereupon the machine may be set in operation and the said second saw will be acted upon by the said first file, the seventeenth saw by the second file and so on throughout the entire bank of saws. Thus the said second saw in the entire bank constitutes the first saw of the first theoretical series, the seventeenth saw in the entire bank will constitute the first saw in the second theoretical series and so on throughout the entire bank of saws. As before stated, means is provided for automatically cutting off the power from the machine immediately after the last tooth upon the last saw of each series has been filed or gummed so that there will be no likelihood of the teeth of any saw being filed a second time and, furthermore, so that the operator of the machine will not be required to pay close attention to the machine toward the end of the filing operation and manually cut off the power. The means provided for automatically cutting off the power includes a bar 316 which is slidably mounted in suitable brackets 317 upon the uprights 2 at one end of the rear of the machine and this bar at its outer end projects beyond the end of the machine and is provided with a socket 318 which receives the lower end of the shank 319 of a shifting yoke 320, this yoke straddling the belt 10 in the manner clearly shown in Figs. 2 and 4 of the drawings. It will be understood that when the bar 316 is shifted outwardly the belt will be shifted from the fixed pulley 8 to the loose pulley 9 thus cutting off the power from the machine and that, on the other hand, when the bar 316 is shifted inwardly, or in other words, toward the left in Fig. 2, the belt will be moved from the loose pulley 9 on to the fixed pulley 8. In order that the first-mentioned movement may take place automatically, a rock lever 321 is pivotally mounted, as at 322, upon the frame of the machine and has a long arm 323 extending below the pivot and connected by a bolt and slot connection, as at 324, to the inner end of the bar 316. Above its pivot 322, the lever 321 is provided with a relatively short arm 325 which projects upwardly beside a fixed arm 326 which extends from the end of the member 61 of the file carriage supporting frame. This arm 326 is provided at its extremity with a laterally projecting pin 327 which is designed to strike against the upper end of the arm 325 when the file carriage supporting frame is shifted beyond a position in which the several files would be opposite the last saws of the several respective series. In other words, the pin 327 will engage the upper end of the arm 325 immediately after the last teeth of the last saws of the several series have been filed and the file carriage supporting frame is shifted through the mechanism heretofore described and including the pawl and rack 255 and 257, respectively. Upon engagement of the pin 327 with the upper end of the arm 325 and upon shifting of the file carriage supporting frame, as stated, the lever 321 will be rocked so as to swing the lower end of the arm 323 toward the right, as shown in Fig. 2 of the drawings, whereby to shift the bar 316 to shift the belt from the fixed to the loose pulley, thus disconnecting the power from the machine and causing the same to cease its operation. It will be understood of course, that after the file carriage supporting frame has been racked back to starting position by a means which will be presently described, and the machine has been otherwise adjusted so as to act upon the saws upon the gin saw shaft disposed within the machine, the machine may be started by manually throwing over the bar 316 either by swinging the arm 323 of the lever 321 or by grasping and moving the belt shifting yoke 320, this manual actuation of the parts serving, of course, to reset the lever 321 for subsequent actuation by the pin 327.

In order that the file carriage supporting frame may be racked back to starting position or adjusted to any desired position should occasion arise, a bracket 328 is fixed upon the end of the member 60 of the file carriage supporting frame and is provided with a socket 329 in which is fixed one end of a stub shaft 330. Rotatably mounted upon this shaft is a hand wheel 331 having a crank handle 332 and connected with the hub of this wheel for rotation therewith is a gear 333 which meshes with a rack 334 fixed upon the head beam 3 of the supporting frame structure for the machine. It will now be understood that by rotating the hand wheel 331, the pawl 255 having been swung upwardly upon its pivot 254 and out of engagement with the rack 257 the file carriage supporting frame may be adjusted toward the left or right, as desired. As before stated, the engagement of the yokes 70 and 109 with the shaft 7 permits of the entire file carriage supporting frame, the file carriages mounted thereon, and the parts associated therewith, being swung upwardly so as to permit of the introduction of the shaft 37 and its saws into the machine and their removal therefrom and as the longer section of the shaft 125 is journaled in bearings upon the file carriage supporting frame, a separable connection or coupling is provided between said longer section of the shaft and the shorter section 125ª. This coupling comprises members 335 and 336 which are respectively fixed upon the shaft sections 125 and 125ª; the meeting ends of the coupling sections are provided with interlocking elements 337 which are arranged to become disengaged when the sections 335 and 336 of the coupling are relatively rotated in opposite directions. Normally, however, the coupling sections connect the shaft sections for rocking movement in unison and prevent separation of their adjacent ends. When it is desired to swing the file carriage supporting frame upwardly for the purpose above stated, the sections of the coupling are relatively rotated and separated and the shaft section 125ª is slid so as to entirely separate the said coupling sections. Under these conditions there can be no transmission of power to the longer section of the shaft 125 and in order to move and hold the files entirely clear of the saws, there is provided a hand lever 338 which is fixed upon the longer section of the shaft 125 and which may be swung upwardly and rearwardly for the purpose of correspondingly moving the tappet fingers 127 and moving the files as stated. In order to support the hand lever 338 after being so swung, a swinging arm 339 is pivotally mounted, as at 340, upon the end one of the arcuate bridge pieces 62 and is provided at its upper end with a yoke 341 designed to engage a lateral boss 342 upon the said lever 338. The arm 339 is provided with a handle 343 which may be grasped for the purpose of swinging the arm 337 into and out of position to support the lever 338. It is also necessary that prior to swinging the file carriage supporting frame upwardly, the shaft sections 162 and 162ª be disconnected and for this purpose a sleeve coupling 344 is disposed to fit the adjacent ends of the shaft sections and is provided with set screws 345 and 346 which may be tightened to respectively bear against the sections 162 and 162ª. By loosening the set screw 345 the shaft section 162ª may be slid in its bearings 224 and 225 so as to move the coupling out of engagement with the end of the shaft section 162 after which the said section 162 may be rocked through the medium of a hand lever 347 thereon so as to swing the stabilizing members 164 downwardly and entirely clear of the saws. The means provided for swinging the file carriage supporting frame upwardly is most clearly shown in Fig. 22 of the drawings and will be presently described.

As before stated, there may at times be one or more saws than a number which is a multiple of file carriages and in order that the surplus saw or saws may be filed after all of the other saws have been acted upon by the files, a second coupling 348 is interposed in the shaft 125 and corresponds in structure to the coupling comprising the sections 335 and 336. This coupling 348 is located to the right of the first file carriage, facing the front of the machine, and after all of the saws have been sharpened with the exception of the surplus saw or saws, the coupling 348 is manipulated so as to disconnect that part of the shaft 125 which is associated with the six right hand file carriages, the coupling comprising the sections 335 and 336 being left intact. The files supported by the said six right hand carriages will then, of course, remain inactive although the file of the extreme left hand or seventh carriage may be operated. Prior to operating this file, however, the file carriage supporting frame is racked back by rotating the hand wheel 331 so as to bring the file into position opposite the surplus saw.

Figure 3:
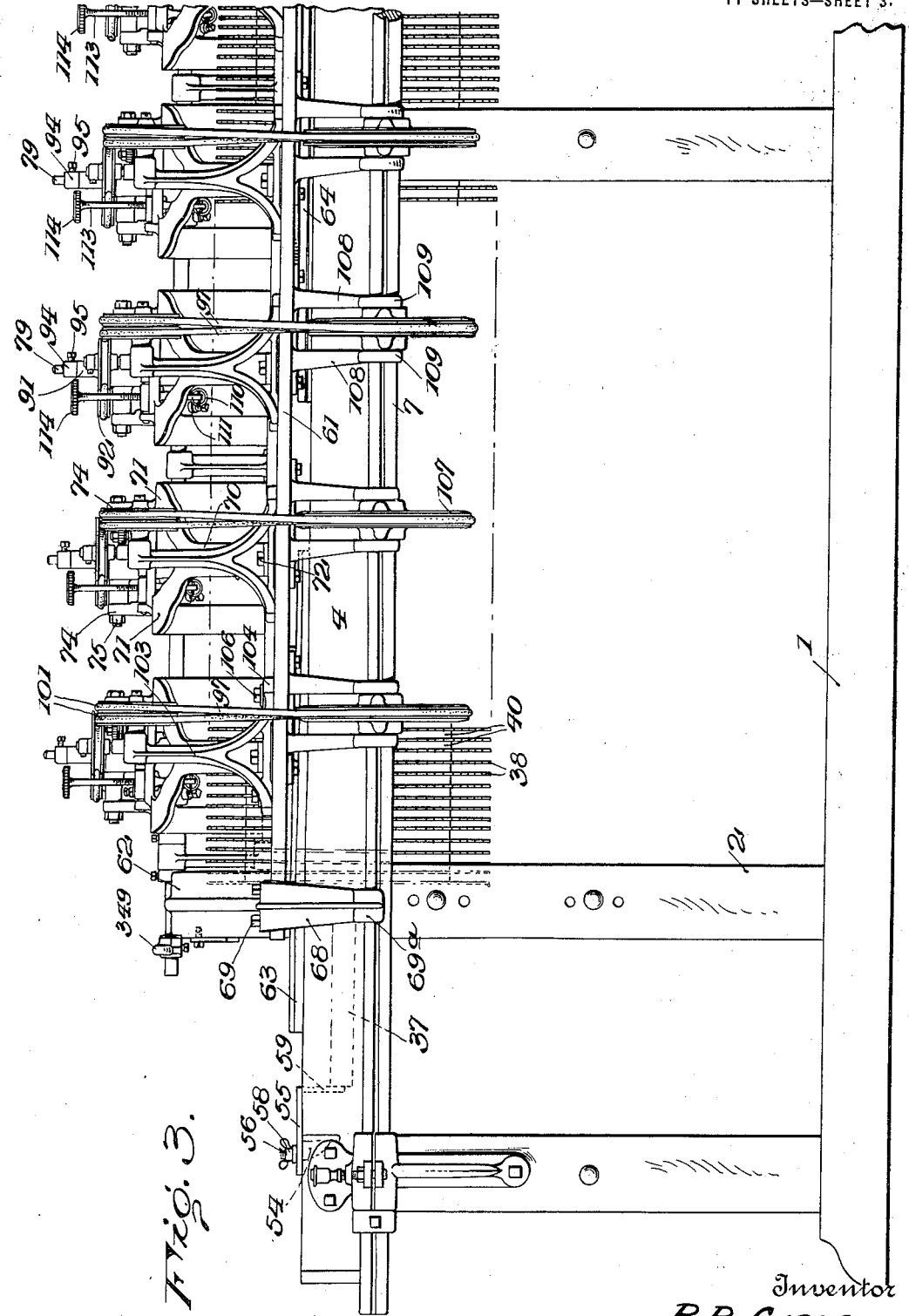
Fig. 3 is a similar view of the right hand end of the machine.

In order that that portion of the shaft 125 with which the six right hand file carriages are associated may be rocked so as to move the files supported by the said carriages out of engagement with the saws which have been filed, the lever device including the lever 338 and its associated parts is duplicated at the extreme right hand end of the machine, as shown in Fig. 3 of the drawings and indicated by the numeral 349.

In order that the file carriage supporting frame may be swung up to permit of removal and introduction of the saw shaft and the saws thereon, as shown in dotted lines in Fig. 22 of the drawings, suitable lifting mechanism is provided as illustrated in the said figure and the same includes a crane arm 350 which is secured at its lower end to the supporting frame structure of the machine at the rear thereof and extends upwardly a suitable distance, it being provided at its upper end with a pulley 351 over which passes a hoisting cable 352. A hook 353 is connected to the end of the hoisting cable and is engageable with any convenient portion of the file carriages or the mechanism upon the file carriage supporting frame. The cable 352 is wound upon a drum 354 which is adapted to be rotated through the medium of a crank handle 355, the drum and handle being fixedly mounted upon a shaft 356 rotatably mounted in a suitable bearing upon the crane arm 350. A ratchet 358 is also fixed upon the shaft 356 and coacting therewith is a pawl 359 which serves to prevent backward rotation of the drum 354. In order that the rotation of the winding drum may be retarded in paying out the cable 352 to lower the file carriage supporting frame, it is preferable that a brake drum 360 be mounted upon the shaft 356 and disposed to surround this drum is a brake band 361 which may be tightened through the adjustment of a hand lever 362.

From the foregoing description of the invention it will be seen that there is provided a machine for filing and gumming the teeth of gin saws, which machine will accommodate a gin saw shaft and the saws thereon as removed from the gin or delinter and which may be adapted to accommodate saws of various diameters through adjustment of the hand wheel 141 and the screw 140.

From the foregoing description of the invention it will be seen that there is provided a machine for filing and gumming the teeth of gin saws, which machine will accommodate a gin saw shaft and the saws thereon as removed from the gin or delinter and which may be adapted to accommodate saws of various diameters through adjustment of the hand wheel 141 and the screw 140 associated therewith so as to advance or retract the files a greater or less distance; may be adapted to have its files act upon saws spaced various distances apart, this distance varying in different makes of gins, by adjusting the abutment block 249 so as to vary the position of the engaging end of the pawl 255 with relation to the teeth of the rack 257; and, which may be adjusted so as to have its files automatically shifted after all of the teeth upon corresponding saws of the several series have been filed, regardless of variation in the number of teeth upon the saws from different makes of gins, by the substitution one for another of different sizes of the gear 12. It will also be seen that there is provided a machine of the class described which will at each filing operation act upon a number of saws simultaneously so that a bank of saws may be expeditiously filed, the machine being entirely automatic in its operation and requiring no attention whatsoever on the part of the operator of the machine in causing the shifting of the files from saw to saw throughout the several series. It will further be apparent from the foregoing that not only is the machine entirely automatic in both the operation of its files upon the successive teeth of the saws and in the shifting of the files from one saw to another, but that in addition means is provided for automatically stopping the operation of the entire machine after the last saw of each of the several series has been filed so that after having started the machine, the operator may leave the same unattended and without fear of any of the saws being filed a second time. It will also be seen that means is provided for taking care of any surplus or odd number of saws.

The files and the mechanism for controlling their movement constitutes a salient feature of this portion of the mechanism and is will be understood that as the file spindle bearing 76 is permitted to swing to bring the file into operation, through the influence of the spring 110, the files will be caused to enter the throats of the teeth with an even and accurate cut and with an upward swing due to the location of the pivot 75 to one side of the axis of the bearing 176. This feature, together with the feature of having the spindle for the file vertically movable in its bearing, prevents the file acting too forcibly on the point and back of the tooth and permits it to, as before stated, accurately ride up into the throat of the tooth during the filing operation.

It will be understood, of course, that if desired a number of racks 257 may be provided having their teeth differently spaced so as to provide for different spacings of the gin saws upon the gin saw shafts.

Having thus described the invention, what is claimed as new is:

1. In a machine of the class described, means for rotating a plurality of saws, a series of abrading elements, means for imparting motion thereto, means for rotating all of said elements in unison, the said abrading elements being designed to work upon a plurality of series of saws into which the entire number of saws is theoretically divided, means for simultaneously intermittently moving the abrading elements into and out of working relation each to any saw of the respective series to successively act upon its teeth in the rotation of the saws, and means operating automatically, after all of the teeth of one saw of each series have been acted upon, to simultaneously shift the abrading elements into position each for action upon another saw of the respective series.

2. In a machine of the class described, means for rotating a series of saws, an abrading element, means for imparting motion thereto, means for intermittently moving the abrading element into and out of working relation to any saw of the series to successively act upon its teeth in the rotation of the saw, means operating automatically, after all of the teeth of one saw have been acted upon, to shift the abrading element into position for action upon the next saw of the series, power transmitting means for imparting motion, in common, to the saws, to the abrading element, to the means for intermittently moving the abrading element into and out of working relation to the saws and to the means for automatically shifting the abrading element, and means acting automatically to render the power transmitting means inactive after all of the teeth upon the last saw of the series have been acted upon by the abrading element.

3. In a machine of the class described, means for rotating a series of saws, an abrading element, means for imparting motion thereto, means for intermittently moving the abrading element into and out of working relation to any saw of the series to successively act upon its teeth in the rotation of the saw, means operating automatically, after all of the teeth of one saw have been acted upon to shift the abrading element into position for action upon another saw of the series, a stabilizing member, means operating automatically upon initial movement of the abrading element into working relation to any saw in the series to move the stabilizing member into engagement with said saw and also acting automatically to move the stabilizing member out of engagement with the saw prior to operation of the shifting means for the abrading element, means for supplying power to the machine whereby to cause operation of all of said means, and means operating to automatically render the power supplying means inactive upon completion of the work of the abrading element upon the last tooth of the last saw of the series.

4. In a machine of the class described, means for rotating a plurality of saws, a series of abrading elements, means for simultaneously imparting motion thereto, the abrading elements being arranged to act upon series of the saws into which the entire number of saws is theoretically divided, means for simultaneously intermittently moving the abrading elements each into and out of working relation to any saw of the respective series to successively act upon its teeth in the rotation of the saws, means operating automatically, after all of the teeth of one saw of each series have been acted upon by the respective abrading element, to simultaneously shift the abrading elements into position each for action upon another saw of the respective series, a series of stabilizing members, means operating automatically upon initial movement of the abrading elements into working relation to saws of their respective series, to move the respective stabilizing members into engagement with said saws, the last mentioned means also acting automatically to simultaneously move the stabilizing members out of engagement with the saws prior to operation of the means for automatically shifting the abrading elements, means for supplying power to the machine for the operation of all of the previously mentioned means, and means for automatically rendering the power supplying means inactive upon cessation of the action of the abrading elements each upon the last tooth of the last saw of its respective series.

5. In a machine of the class described, means for rotating a series of saws, an abrading element, means for imparting motion thereto, means for intermittently moving the abrading element into and out of working relation to any saw of the series to successively act upon its teeth in the rotation of the saw, means acting automatically after all of the teeth of one saw have been acted upon, to shift the abrading element into position for action upon another saw of the series, and means for rendering the intermittent moving means for the abrading element inactive during the operation of the shifting means for the abrading element.

6. In a machine of the class described, means for rotating a series of saws, an abrading element, means for imparting motion thereto, means for intermittently moving the abrading element into and out of working relation to any saw of the series to successively act upon its teeth in the rotation of the saw, a normally idle shaft, a rotary element, means for automatically connecting the shaft for rotation with the said rotary element after all of the teeth of one saw have been acted upon by the abrading element, means operable through the rotation of the shaft to render the intermittent moving means for the abrading element inactive, means operable through the rotation of the shaft for shifting the abrading element into position for action upon another saw of the series, means automatically operable subsequent to the shifting of the abrading element to render inactive the first-mentioned means operating through the rotation of the shaft, and means actuated through rotation of the shaft to disconnect the rotary element from the shaft.

7. In a machine of the class described, means for rotating a series of saws, an abrading element, means for imparting motion thereto, means for intermittently moving the abrading element into and out of working relation to any saw of the series to successively act upon its teeth in the rotation of the saw, a stabilizing member, a normally idle shaft, a rotary element, means operable automatically to clutch the shaft and rotary element to impart rotary motion to the shaft after all of the teeth of one saw have been acted upon, means automatically operable through rotation of the shaft to move the stabilizing member out of position engaging the saw, the teeth of which have been filed, means automatically operable through rotation of the shaft to render the intermittent moving means for the abrading element inactive, means automatically operable through rotation of the shaft to shift the abrading element into position for action upon another saw of the series, the second-mentioned shaft-operated means being operable upon continued rotation of the shaft to permit the movement of the stabilizing member into engagement with the said other saw of the series, means operable automatically subsequent to operation of the shifting means for the abrading element, to permit of movement of the abrading element into working relation to the said other saw of the series, and means operable through rotation of the shaft to unclutch the rotary element and shaft subsequent to the actuation of all of said shaft-operated means.

8. In a machine of the class described, means for rotating a series of saws, an abrading element, means for imparting motion thereto, means for intermittently moving the abrading element into and out of working relation to any saw of the series to successively act upon its teeth in the rotation of the saw, a stabilizing member, a normally idle shaft, a rotary element, means operable automatically to clutch the shaft and rotary element to impart rotary motion to the shaft after all of the teeth of one saw have been acted upon, means automatically operable through rotation of the shaft to move the stabilizing member out of position engaging the saw, the teeth of which have been filed, means automatically operable through rotation of the shaft to render the intermittent moving means for the abrading element inactive, means automatically operable through rotation of the shaft to shift the abrading element into position for action upon another saw of the series, the second-mentioned shaft-operated means being operable upon continued rotation of the shaft to permit the movement of the stabilizing member into engagement with the said other saw of the series, means operable automatically subsequent to operation of the shifting means for the abrading element, to permit of movement of the abrading element into working relation to the said other saw of the series, means operable through rotation of the shaft to unclutch the rotary element and shaft subsequent to the actuation of all of said shaft-operated means, means whereby power may be transmitted to the machine for the operation of the previously mentioned means, and means arranged for automatic actuation upon cessation of action of the abrading element upon the last tooth of the last saw of the series to render the power transmitting means inactive.

9. In a machine of the class described, means for rotating a series of saws, an abrading element, means for imparting motion thereto, means for intermittently moving the abrading element into and out of working relation to any saw of the series to successively act upon its teeth in the rotation of the saw, a stabilizing member, means for moving the stabilizing member into engagement with any saw of the series upon initial movement of the abrading element into working relation to said saw, the said abrading element and stabilizing member being shiftable in unison, means acting automatically to render the intermittent moving means for the abrading element inactive subsequent to filing of the last tooth upon any saw of the series and for supporting the said abrading element clear of the saw, means acting substantially simultaneously with the last-mentioned means for moving the stabilizing member out of engagement with said saw, means for shifting the abrading element and stabilizing member to position for coaction with another saw of the series, the moving means for the stabilizing member being operable subsequent to such shifting to permit of return of the said member and its engagement with the said other saw of the series, and means operable automatically subsequent to said shifting operation to render inactive the means for holding the abrading element clear of the saws whereby to permit of subsequent operation of the intermittent moving means for the abrading element.

10. In a machine of the class described, means for rotating a series of saws, an abrading element, means for imparting motion thereto, means for intermittently moving the abrading element into and out of working relation to any saw of the series to successively act upon its teeth in the rotation of the saw, a stabilizing member, means for moving the stabilizing member into engagement with any saw of the series upon initial movement of the abrading element into working relation to said saw, the said abrading element and stabilizing member being shiftable in unison, means acting automatically to render the intermittent moving means for the abrading element inactive subsequent to filing of the last tooth upon any saw of the series, and for supporting the said abrading element clear of the saw, means acting substantially simultaneously with the last-mentioned means for moving the stabilizing member out of engagement with said saw, means for shifting the abrading element and stabilizing member to position for coaction with another saw of the series, the moving means for the stabilizing member being operable subsequent to such shifting to permit of return of the said member and its engagement with the said other saw of the series, means operable automatically subsequent to said shifting operation to render inactive the means for holding the abrading element clear of the saws whereby to permit of subsequent operation of the intermittent moving means for the abrading element, means whereby power may be transmitted to all of the previously mentioned means in common, and means operable to render the power transmitting means inactive after the last tooth of the last saw of the series has been acted upon by the abrading element.

11. In a machine of the class described, means for continuously rotating a saw, an abrading element, means for imparting motion thereto, means for automatically feeding the abrading element against the teeth of the saw and causing the said element to follow the engaged tooth as the saw is rotated and as the tooth recedes from the abrading element, and means for automatically moving the abrading element out of working relation to the saw subsequent to its action upon each tooth.

12. In a machine of the class described, means for continuously rotating a saw, an abrading element, means for imparting motion thereto, means for automatically feeding the abrading element against the teeth of the saw and causing the said element to follow the engaged tooth as the saw is rotated and as the tooth recedes from the abrading element, means for limiting the movement of the abrading element against the saw, and means for automatically moving the abrading element out of working relation to the saw subsequent to its action upon each tooth.

13. In a machine of the class described, means for continuously rotating a saw, an abrading element, means for imparting motion thereto, means for automatically feeding the abrading element against the teeth of the saw and causing the said element to follow the engaged tooth as the saw is rotated and as the tooth recedes from the abrading element, means for first yieldably resisting and then positively limiting the movement of the abrading element against the saw, and means for automatically moving the abrading element out of working relation to the saw subsequent to its action upon each tooth.

14. In a machine of the class described, means for continuously rotating a saw, an abrading element, means for imparting motion thereto, a support for the said element mounted for oscillation whereby to provide for movement of the abrading element in an arc transecting the periphery of the saw, means for moving the said support to feed the abrading element against the teeth of the saw, and means for automatically oscillating the support to move the abrading element out of working relation to the saw subsequent to the action of the abrading element upon each tooth.

15. In a machine of the class described, means for rotating a saw, an abrading element, means for imparting motion thereto, a support for the abrading element, means for moving the support to feed the abrading element against the teeth of the saw, an adjustable stop for limiting the feeding movement of the said support, and means for automatically moving the support to move the abrading element out of working relation to the saw subsequent to its action upon each tooth.

16. In a machine of the class described, means for rotating a saw, an abrading element, means for imparting motion thereto, a support for the abrading element, means for moving the support to feed the abrading element against the teeth of the saw, an abutment for positively limiting the feeding movement of the support, a yieldable shock absorbing element carried by the abutment and engageable by that element of the support which is designed to engage the abutment, and means for automatically moving the support to retract the abrading element from working engagement with the saw subsequent to its action upon each tooth.

17. In a machine of the class described, means for rotating a saw, an abrading element, means for imparting motion thereto, an oscillatory support for the abrading element, yieldable means for oscillating the support to feed the abrading element against the teeth of the saw, an element extending from the support, an adjustable abutment screw positioned for engagement by the said element upon the support for positively limiting the feeding movement of the support, the said screw having a bore, a shock absorbing pin slidably mounted in the bore and engageable by the said element upon the support, a spring yieldably resisting movement of the said pin, and means for automatically oscillating the support to move the abrading element into working relation to the saw subsequent to its action upon each tooth.

18. In a machine of the class described, means for rotating a saw, an abrading element, means for imparting motion thereto, an oscillatory support for the abrading element, yieldable means for oscillating the support to feed the abrading element against the teeth of the saw, an element extending from the support, an adjustable abutment screw positioned for engagement by the said element upon the support for positively limiting the feeding movement of the support, the said screw having a bore, a shock absorbing pin slidably mounted in the bore and engageable by the said element upon the support, a spring yieldably resisting movement of the said pin, one end of the pin extending through the end of the screw, a nut adjustably threaded upon the said end of the pin and bearing against the said end of the screw whereby the tension of the spring upon the pin may be varied, and means for automatically oscillating the support to move the abrading element into working relation to the saw subsequent to its action upon each tooth.

19. In a machine of the class described, means for rotating a saw, an oscillatory supporting bearing, a spindle rotatably and freely slidably mounted in the supporting bearing whereby when the abrading element is brought into engagement with the back of a tooth of the saw it may freely ride up into the throat between the said tooth and the next adjacent tooth, and means for oscillating the supporting bearing to move the abrading element into and out of working engagement to the saw.

20. In a machine of the class described, means for rotating a saw, an oscillatory supporting bearing, a spindle rotatably and freely slidably mounted in the supporting bearing whereby when the abrading element is brought into engagement with the back of a tooth of the saw it may freely ride up into the throat between the said tooth and the next adjacent tooth, means yieldably resisting the sliding movement of the spindle in the opposite direction, and means for oscillating the supporting bearing to move the abrading element into and out of working engagement to the saw.

21. In a machine of the class described, means for rotating a saw, an oscillatory supporting bearing having a bore, a power transmission element having a hub rotatably fitting in said bearing, a spindle rotatable with the said hub and freely slidable therein, an abrading element carried by the spindle, and means for oscillating the supporting bearing to move the abrading element into and out of working relation to the saw.

22. In a machine of the class described, means for rotating a saw, an oscillatory supporting bearing having a bore, a power transmission element having a hub rotatably fitting in said bearing and held against longitudinal displacement therein, a spindle rotatable with the said hub and freely slidable in one direction therein, an abrading element carried by the spindle, means yieldably resisting sliding movement of the spindle in the opposite direction, and means for oscillating the supporting bearing to move the abrading element into and out of working relation to the saw.

23. In a machine of the class described, means for rotating a saw, an oscillatory supporting bearing having a bore, a power-transmission element having a hub rotatably fitting in said bearing and held against longitudinal displacement therein, a spindle rotatable with the said hub and freely slidable in one direction therein, a stop upon the spindle, a spring interposed between the stop and the power transmission element for yieldably resisting sliding movement of the spindle in the hub of the said element in the opposite direction, an abrading element carried by the spindle, and means for oscillating the supporting bearing to move the abrading element into and out of working relation to the saw.

24. In a machine of the class described, means for rotating a saw, an oscillatory supporting bearing having a bore, a power transmission element having a hub rotatably fitting in said bearing and held against longitudinal displacement therein, a spindle rotatable with the said hub and freely slidable in one direction therein, an adjustable stop upon the spindle, a spring interposed between the stop and the power transmission element for yieldably resisting sliding movement of the spindle in the hub of the said element in the opposite direction, an abrading element carried by the spindle, and means for oscillating the supporting bearing to move the abrading element into and out of working relation to the saw.

25. In a machine of the class described, means for rotating a saw, an oscillatory supporting member, an abrading element carried thereby, means for imparting motion to the abrading element, means tending to move the support to feed the abrading element against the teeth of the saw, an element extending from the said supporting member, a shaft, means for intermittently oscillating the shaft, and a tappet element carried by the shaft for coaction with the last-mentioned element.

26. In a machine of the class described, means for rotating a saw, an oscillatory supporting member, an abrading element carried thereby, means for imparting motion to the abrading element, means tending to oscillate the supporting member to bring the abrading element into working relation to the teeth of the saw, a shaft, means for intermittently oscillating the shaft, a tappet element upon the shaft, and an abutment upon the supporting member in the path of movement of the tappet element.

27. In a machine of the class described, means for rotating a saw, an oscillatory supporting member, an abrading element carried thereby, means for imparting motion to the abrading element, means tending to oscillate the supporting member to bring the abrading element into working relation to the teeth of the saw, a shaft, means for intermittently oscillating the shaft, a tappet element upon the shaft, and an adjustable abutment upon the supporting member in the path of movement of the tappet element.

28. In a machine of the class described, means for rotating a saw, an oscillatory supporting member, an abrading element carried thereby, means for imparting motion to the abrading element, means tending to oscillate the supporting member to bring the abrading element into working relation to the teeth of the saw, a shaft, means for intermittently oscillating the shaft, a tappet element upon the shaft, and an adjustable abutment upon the supporting member in the path of movement of the tappet element, the said abutment upon the supporting member being spaced from the tappet element during the period the abrading element is in working relation to the teeth of the saw.

29. In a machine of the class described, a work support, an abrading element movable into and out of active relation to the work, an oscillatory shaft, means upon the shaft operable in the oscillation of the shaft to so move the abrading element, and means for imparting oscillatory movement to the shaft.

30. In a machine of the class described, a work support, an abrading element movable into and out of active relation to the work, an oscillatory shaft, means upon the shaft operable in the oscillation of the shaft to so move the abrading element, means for imparting oscillatory movement to the shaft, and means for angularly adjusting the shaft independently of and with relation to the last-mentioned means.

31. In a machine of the class described, a work support, an abrading element movable into and out of active relation to the work, an oscillatory shaft, means upon the shaft operating in the oscillation of the shaft to so move the abrading element, an arm pivotally connected with the shaft, a member rigid with relation to the shaft and having an element engaging the said arm to prevent pivotal movement thereof in one direction, and means coacting with the arm for oscillating the same to impart oscillatory motion to the shaft.

32. In a machine of the class described, a work support, an abrading element movable into and out of active relation to the work, an oscillatory shaft, means upon the shaft operating in the oscillation of the shaft to so move the abrading element, an arm pivotally connected with the shaft, a member rigid with relation to the shaft, adjustable means carried by the said member and engaging the arm to prevent pivotal movement of the arm in one direction, and means coacting with the arm for oscillating the same to impart oscillatory motion to the shaft.

33. In a machine of the class described, a work support, an abrading element movable into and out of active relation to the work, an oscillatory shaft, means upon the shaft, operable in the oscillation of the shaft, to so move the abrading element, an arm pivotally connected with the shaft, an arm rigid with relation to the shaft and extending in spaced relation to the first-mentioned arm, means for varying the angular relation of the arms, and means coacting with the first-mentioned arm for oscillating the same to impart oscillatory motion to the shaft.

34. In a machine of the class described, a work support, an abrading element movable into and out of active relation to the work, an oscillatory shaft, means upon the shaft operable in the oscillation of the shaft to so move the abrading element, a collar connected with the shaft for oscillation, an arm pivotally connected with the collar, a rigid arm extending from the collar above the first-mentioned arm, an adjusting screw adjustably threaded through the rigid arm and bearing against the pivoted arm whereby to limit the upward movement of the latter upon its pivot, and means coacting with the pivoted arm for oscillating the same to impart oscillatory motion to the shaft.

35. In a machine of the class described, a work support, an abrading means movable into and out of active relation to the work, an oscillatory shaft, a tappet arm upon the shaft operating in the oscillation of the shaft to so move the abrading means, means for imparting oscillatory movement to the shaft, and means for angularly adjusting the shaft to vary the position of the tappet arm with relation to the abrading means.

36. In a machine of the class described, a work support, an abrading element movable into and out of active relation to the work, a shaft formed in sections, means separably connecting the sections of the shaft, means coacting with one section of the shaft to impart motion thereto and through the coupling to the other section of the shaft, means upon the last-mentioned section of the shaft for so moving the abrading element, and means upon the last-mentioned section of the shaft for rocking the same when the sections of the shaft have been disconnected, to render inactive the means upon the said last-mentioned section which actuates the abrading element.

37. In a machine of the class described, a work support, an abrading element movable into and out of active relation to the work, a shaft formed in sections, means separably connecting the sections of the shaft, means coacting with one section of the shaft to impart motion thereto and through the coupling to the other section of the shaft, means upon the last-mentioned section of the shaft for so moving the abrading element, a hand lever fixed upon the last-mentioned section of the shaft and adapted to be swung to so rock the said section when the sections of the shaft have been disconnected, as to render inactive the means for moving the abrading element, and means movable to position to engage and support the said hand lever when the same has been so moved.

38. In a machine of the class described, means for the support and rotation of a series of saws, an abrading element, means for actuating the same to successively act upon the teeth of any saw of the series, shiftable supporting means for the abrading element, and means for automatically shifting the said supporting means subsequent to action of the abrading element upon the last tooth of a saw of the series, whereby to present the said element to another saw of the series, the last-mentioned means being adjustable to vary the distance to which the said supporting means is shifted whereby to provide for variations in the spacing of different series of saws.

39. In a machine of the class described, means for the support and rotation of a series of saws, an abrading element, means for actuating the same to successively act upon the teeth of any saw of the series, shiftable supporting means for the abrading element, pawl and rack mechanism for shifting the said supporting means, means for automatically actuating the said mechanism to shift the said supporting means subsequent to action of the abrading element upon the last tooth of a saw of the series whereby to present the said element to another saw of the series, and means for varying the throw of the pawl of the said mechanism.

40. In a machine of the class described, means for the support and rotation of a series of saws, an abrading element, means for actuating the same to successively act upon the teeth of any saw of the series, shiftable supporting means for the abrading element, a rack carried by the said supporting means, a reciprocatory member, a pawl connected therewith and coacting with the rack, and means for automatically reciprocating the said member subsequent to action of the abrading element upon the last tooth of a saw of the series, whereby to present the said abrading element to another saw of the series.

41. In a machine of the class described, means for the support and rotation of a series of saws, an abrading element, means for actuating the same to successively act upon the teeth of any saw of the series, shiftable supporting means for the abrading element, a rack connected with the said supporting means, a reciprocatory member, a pawl connected therewith and coacting with the rack, a rotary cam, an abutment element upon the said reciprocatory member, means yieldably holding the reciprocatory member in retracted position and with the said abutment element engaging the said cam, and means for automatically imparting rotary motion to the cam subsequent to the action of the abrading element upon the last tooth of a saw of the series, whereby to reciprocate the said member and shift the rack and the supporting means to present the abrading element to another saw of the series.

42. In a machine of the class described, means for the support and rotation of a series of saws, an abrading element, means for actuating the same to successively act upon the teeth of any saw of the series, shiftable supporting means for the abrading element, a rack connected with the said supporting means, a reciprocatory member, a pawl connected therewith and coacting with the rack, a rotary cam, an adjustable abutment element upon the said reciprocatory member, means yieldably holding the reciprocatory member in retracted position and with the said abutment element engaging the said cam, and means for automatically imparting rotary motion to the cam subsequent to action of the abrading element upon the last tooth of a saw of the series, whereby to reciprocate the said member and shift the rack and the supporting means to present the abrading element to another saw of the series.

43. In a machine of the class described, means for the support and rotation of a series of saws, an abrading element, means for actuating the same to successively act upon the teeth of any saw of the series, shiftable supporting means for the abrading element, a rack connected with the supporting means, a reciprocatory member, a pawl carried thereby and coacting with the rack, a rotary cam, an abutment element upon the member for coaction with the cam, means yieldably holding the said reciprocatory member in position with the abutment element engaging the working surface of the cam, means for adjusting the said abutment element whereby to adjust the reciprocatory member with relation to the cam and thereby adjust the pawl with relation to the rack to vary the throw of the rack and, consequently, the distance to which the supporting means is shifted, and means for automatically rotating the said cam subsequent to action of the abrading element upon the last tooth of a saw of the series whereby to cause shifting of the supporting means to present the said abrading element to another saw of the series.

44. In a machine of the class described, means for the support and rotation of a series of saws, an abrading element, means for actuating the same to successively act upon the teeth of any saw of the series, shiftable supporting means for the abrading element, a rack carried by the supporting means, a reciprocatory member, a pawl carried thereby and coacting with the rack, a rotary cam, an abutment block slidably adjustably mounted upon the said reciprocatory member and engaging at one end against the working face of the cam, an adjusting screw mounted upon the said reciprocatory member and engaging the other end of the block whereby the abutment block may be adjusted upon the said member to vary the relation of the block to the teeth of the rack and thereby vary the throw of the rack and, consequently, the distance to which the supporting means is shifted upon actuation of the rack by the pawl, a spring yieldably holding the reciprocatory member in position with the abutment block engaging the cam, and means for automatically rotating the cam subsequent to action of the abrading element upon the last tooth of a saw of the series, whereby to cause shifting of the supporting means to present the said element to another saw of the series.

45. In a machine of the class described, means for the support and rotation of a series of saws, an abrading element, means for actuating the same to successively act upon the teeth of any saw of the series, shiftable supporting means for the abrading element, means for automatically shifting the said supporting means subsequent to action of the abrading element upon the last tooth of a saw of the series, whereby to present the said element to another saw of the series, and means for automatically rendering inactive the means for rotating the saws, the actuating means for the abrading element and the actuating means for the cam subsequent to action of the abrading element upon the last tooth of the last saw of the series.

46. In a machine of the class described, means for the support and rotation of a series of saws, an abrading element, means for actuating the same to successively act upon the teeth of any saw of the series, shiftable supporting means for the abrading element, means for automatically shifting the said supporting means subsequent to action of the abrading element upon the last tooth of a saw of the series whereby to present the said element to another saw of the series, and manually operable means for shifting the supporting means independently of the last-mentioned means.

47. In a machine of the class described, means for the support and rotation of a series of saws, an abrading element, means for actuating the same to successively act upon the teeth of any saw of the series, shiftable supporting means for the abrading element, a rack carried by said supporting means, a reciprocatory member, a pawl carried thereby for coaction with the rack, a normally idle shaft, a cam carried thereby and coacting with the said reciprocatory member for reciprocating the same to actuate the pawl to impart shifting movement to the rack, means for automatically rotating the shaft subsequent to action of the abrading element upon the last tooth of a saw of the series, and means for stopping the rotation of the shaft subsequent to action of the cam upon the said reciprocatory member.

48. In a machine of the class described, means for supporting and rotating a saw, an abrading means, means for actuating the abrading means to cause the same to act successively upon the teeth of the saw, and stabilizing means for the saw including spaced fingers designed to straddle the peripheral portion of the saw and having opposing flat faces to engage against the opposite faces of the saw at the peripheral portion thereof, the said fingers outwardly beyond their said faces having their opposing sides beveled, whereby to enable the fingers to readily pass the periphery of the saw.

49. In a machine of the class described, means for supporting and rotating a series of saws, an abrading means, means for actuating the abarding means to cause the same to act successively upon the teeth of any saw of the series, means for shifting the abrading means from one saw to another, and means for laterally displacing the peripheral portions of the saws at opposite sides of a saw to which the abrading means is presented for action upon the teeth thereof.

50. In a machine of the class described, means for supporting and rotating a series of saws, an abrading means, means for actuating the abrading means to cause the same to act successively upon the teeth of any saw of the series, means for shifting the abrading means from one saw to another, means for laterally displacing the peripheral portions of the saws at opposite sides of a saw to which the abrading means is presented for action upon the teeth thereof, and means for engaging the opposite faces of the last-mentioned saw at the peripheral portion thereof to stabilize the said saw during the action thereon of the said abrading means.

51. In a machine of the class described, means for supporting and rotating a series of saws, an abrading means, means for actuating the abrading means to cause the same to act successively upon the teeth of any saw of the series, means for shifting the abrading means from one saw to another, and means for stabilizing the saw being acted upon by the abrading means and for laterally displacing the peripheral portions of the saws at opposite sides of the first-mentioned saw.

52. In a machine of the class described, means for supporting and rotating a series of saws, an abrading means, means for actuating the abrading means to cause the same to act successively upon the teeth of any saw of the series, means for shifting the abrading means from one saw to another, and means for stabilizing the saw being acted upon by the abrading means and for laterally displacing the peripheral portions of the saws at opposite sides of the first-mentioned saw, the said means including spaced fingers arranged to straddle the first-mentioned saw and to engage the opposite faces thereof, the said fingers being designed to have wedging engagement between the first-mentioned saw and the respective last-mentioned saws.

53. In a machine of the class described, means for supporting and rotating a series of saws, an abrading means, means for actuating the abrading means to cause the same to act successively upon the teeth of any saw of the series, means for shifting the abrading means from one saw to another, and means for stabilizing the saw being acted upon by the abrading means and for laterally displacing the peripheral portions of the saws at opposite sides of the first-mentioned saw, the said means including spaced fingers designed to straddle the peripheral portion of the first-mentioned saw and having opposed flat faces to engage the opposite faces of the peripheral portions of the said saw, the fingers being of a width greater than the space between the first-mentioned saw and each of the last-mentioned saws, and the ends of the fingers being laterally beveled.

54. In a machine of the class described, means for supporting and rotating a series of saws, an abrading means, means for actuating the abrading means to cause the same to act successively upon the teeth of any saw of the series, means for shifting the abrading means from one saw to another, a shaft, a stabilizing member mounted upon the shaft, a rotary cam, operative connection between the cam and the shaft, and means for automatically rotating the cam to actuate the shaft to move the stabilizing member out of engagement with the saw acted upon by the abrading means, subsequent to actuation of the means for shifting the abrading means.

55. In a machine of the class described, means for supporting and rotating a series of saws, an abrading means, means for actuating the abrading means to cause the same to act successively upon the teeth of any saw of the series, means for shifting the abrading means from one saw to another, a shaft, a stabilizing member mounted upon the shaft, a rotary cam, operative connection between the cam and the shaft, means for automatically rotating the cam to actuate the shaft to move the stabilizing member out of engagement with the saw acted upon by the abrading means, subsequent to actuation of the means for shifting the abrading means, and means for automatically returning the shaft to normal position to bring the stabilizing member into engagement with the next saw to be acted upon subsequent to actuation of the means for shifting the abrading means.

56. In a machine of the class described, means for supporting and rotating a series of saws, an abrading means, means for actuating the abrading means to cause the same to act successively upon the teeth of any saw of the series, means for shifting the abrading means from one saw to another, a shaft, a stabilizing member upon the shaft, the shaft being arranged for oscillation to move the stabilizing member out of and into engagement with the saw to be acted upon by the abrading means, means normally holding the shaft oscillated to hold the stabilizing member in engagement with the saw, a rotary cam, and means arranged for actuation through rotation of the cam to rock the said shaft to move the stabilizing member out of engagement with the saw prior to actuation of the means for shifting the abrading means.

57. In a machine of the class described, means for supporting and rotating a series of saws, an abrading means, means for actuating the abrading means to cause the same to act successively upon the teeth of any saw of the series, means for shifting the abrading means from one saw to another, an oscillatory shaft, a stabilizing member carried thereby, means normally holding the shaft rocked to position to engage the stabilizing member to be acted upon by the abrading means, an arm connected with the shaft for rotation therewith, a rock lever, connection between the arm and one arm of the rock lever, a cam engaged by the other arm of the rock lever, and means for automatically rotating the cam prior to actuation of the means for shifting the abrading means, whereby to rock the said shaft to move the stabilizing member out of engagement with the said saw.

58. In a machine of the class described, means for supporting and rotating a series of saws, an abrading means, means for actuating the abrading means to cause the same to act successively upon the teeth of any saw of the series, means for shifting the abrading means from one saw to another, a shaft supported for oscillation, a stabilizing member mounted thereon and constructed to engage a saw to be acted upon by the abrading means, a crank arm mounted upon the shaft for movement therewith, a spring connected with the arm and yieldably holding the shaft in position with the stabilizing member in engagement with a saw being acted upon by the abrading element, a rock lever, connection between one arm of the rock lever and the said crank arm, a rotary cam, the other arm of the rock lever normally engaging the low point of the cam, and means acting automatically to impart rotary motion to the cam to cause rocking of the shaft to move the stabilizing member out of engagement with the saw acted upon by the abrading means prior to actuation of the means for shifting the abrading means.

59. In a machine of the class described, means for supporting and rotating a series of saws, an abrading means, means for actuating the abrading means to cause the same to act successively upon the teeth of any saw of the series, means for shifting the abrading means from one saw to another, a shaft, a stabilizing member mounted thereon and constructed to engage a saw being acted upon by the abrading means, the said shaft being formed in separably connected sections and the said stabilizing member being mounted upon one of said sections solely, means operatively connected with the other section of the shaft for automatically imparting rocking motion to the first-mentioned section of the shaft to move the stabilizing member out of engagement with the saw prior to actuation of the means for shifting the abrading means, and manually operable means for rocking the first-mentioned section of the shaft when the said sections of the shaft are disconnected.

60. In a machine of the class described, means for supporting and rotating a series of saws, an abrading means, means for actuating the abrading means to cause the same to act successively upon the teeth of any saw of the series, means for shifting the abrading means from one saw to another, a shaft, a stabilizing member mounted thereon and constructed to engage a saw being acted upon by the abrading means, the said shaft being formed in separably connected sections and the said stabilizing member being mounted upon one of said sections solely, means operatively connected with the other section of the shaft for automatically imparting rocking motion to the first-mentioned section of the shaft to move the stabilizing member out of engagement with the saw prior to actuation of the means for shifting the abrading means, manually operable means for rocking the first-mentioned section of the shaft when the said sections of the shaft are disconnected, the said shaft being longitudinally movable with the shiftable abrading means, and means for holding the actuating means for the second-mentioned section of the shaft against longitudinal sliding movement therewith.

61. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, and means actuated through rotation of an element of the saw rotating means for closing the clutching means after the last tooth upon any saw of the series has been acted upon by the abrading means.

62. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, means actuated through rotation of an element of the saw rotating means for closing the clutching means after the last tooth upon any saw of the series has been acted upon by the abrading means, and means actuated by the said shaft for breaking the clutching means subsequent to return of the abrading means to active position.

63. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged, when rocked in one direction, to close the said clutch to cause rotation of the shaft with the gear element, a spring actuated trip member operatively engaged with the said rocking element, latch means normally holding the trip member against actuation, and means actuated through rotation of an element of the saw rotating means for rendering the latch means inactive after the last tooth upon any saw of the series has been acted upon by the abrading means.

64. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged when rocked in one direction to close the said clutch to cause rotation of the shaft with the gear element, a trip plate slidably supported and operatively engaged by the rock element, means tending to rock the said element and slide the said trip plate, latch means for holding the said trip plate against sliding movement under the influence of the spring and rock element, and means actuated through rotation of an element of the saw rotating means for rendering the latch means inactive after the last tooth upon any saw in the series has been acted upon by the abrading means.

65. In a machine of the class described,
50 means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rock lever having one arm operatively engaging an element of the clutch means whereby to close the clutch when the said lever is rocked in one direction, a fixed support, a trip plate slidably mounted thereon, a spring connected with the other arm of the said lever and tending to rock the lever in the direction stated, a keeper member upon the support, a latch element upon the trip plate engageable with the keeper member to normally restrain the trip plate against movement under the influence of the spring, and means actuated through rotation of an element of the saw rotating means for rendering the latch element inactive after the last tooth upon any saw of the series has been acted upon by the abrading means.

66. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged when rocked in one direction, to close the said clutch to cause rotation of the shaft with the gear element, a spring actuated trip member operatively engaged with the said rocking element, latch means normally holding the trip member against actuation, means actuated through rotation of an element of the saw rotating means for rendering the latch means inactive after the last tooth upon any saw of the series has been acted upon by the abrading means, and means for breaking the clutch subsequent to return of the abrading means to active position.

67. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a trip plate slidably supported and operatively engaged by the rock element, means tending to rock the said element and slide the said trip plate, latch means for holding the said trip plate against sliding movement under the influence of the spring and rock element, and means for breaking the clutch subsequent to return of the abrading means to active position.

68. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rock lever having one arm operatively engaging an element of the clutch means whereby to close the clutch when the said lever is rocked in one direction, a fixed support, a trip plate slidably mounted thereon, a spring connected with the other arm of the said lever and tending to rock the lever in the direction stated, a keeper member upon the support, a latch element upon the trip plate engageable with the keeper member to normally restrain the trip plate against movement under the influence of the spring, means actuated through rotation of an element of the saw rotating means for rendering the latch element inactive after the last tooth upon any saw of the series has been acted upon by the abrading means, and means for breaking the clutch subsequent to return of the abrading means to active position.

69. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged when rocked in one direction, to close the said clutch to cause rotation of the shaft with the gear element, a spring actuated trip member operatively engaged with the said rocking element, latch means normally holding the trip member against actuation, means actuated through rotation of an element of the saw rotating means for rendering the latch means inactive after the last tooth upon any saw of the series has been acted upon by the abrading means, and means actuated through continued rotation of the said shaft subsequent to operation of the second-mentioned shaft-operated means, for breaking the said clutch.

70. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged when rocked in one direction to close the said clutch to cause rotation of the shaft with the gear element, a trip plate slidably supported and operatively engaged by the rock element, means tending to rock the said element and slide the said trip plate, latch means for holding the said trip plate against sliding movement under the influence of the spring and rock element, means actuated through rotation of an element of the saw rotating means for rendering the latch means inactive after the last tooth upon any saw in the series has been acted upon by the abrading means, and means actuated through continued rotation of the said shaft subsequent to operation of the second-mentioned shaft-operated means, for breaking the said clutch.

71. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rock lever having one arm operatively engaging an element of the clutch means whereby to close the clutch when the said lever is rocked in one direction, a fixed support, a trip plate slidably of an element of the saw rotating means for rendering the latch means inactive after the last tooth upon any saw of the series has been acted upon by the abrading means, a cam upon the said shaft, and an abutment element carried by the clutch closing member and arranged to be acted upon by the said cam subsequent to operation of the means for shifting the abrading means, whereby to actuate the clutch closing member to reset the same and through its movement to reset the said trip member.

76. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under the influence of the means for moving the clutch closing member, means actuated through rotation of an element of the saw rotating means for rendering the latch means inactive after the last tooth upon any saw of the series has been acted upon by the abrading means, a cam upon the said shaft, an abutment element carried by the clutch closing member and arranged to be acted upon by the said cam subsequent to operation of the means for shifting the abrading means, whereby to actuate the clutch closing member to reset the same and through its movement to reset the said trip member, and means automatically operable to break the clutch subsequent to resetting of the clutch closing member.

77. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under the influence of the means for moving the clutch closing member, means actuated through rotation of an element of the saw rotating means for rendering the latch means inactive after the last tooth upon any saw of the series has been acted upon by the abrading means, a cam upon the said shaft, an abutment element carried by the clutch closing member and arranged to be acted upon by the said cam subsequent to operation of the means for shifting the abrading means, whereby to actuate the clutch closing member to reset the same and through its movement to reset the said trip member, and means actuated through continued rotation of the said shaft for automatically breaking the said clutch subsequent to resetting of the clutch closing member.

78. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a rocking member operatively engaging an element of the clutch means and arranged when rocked in one direction to close the said clutch to cause rotation of the shaft with the gear element, a spring actuated trip member operatively engaged with the said rocking element, latch means normally holding the trip member against actuation, means actuated through rotation of an element of the saw rotating means for rendering the latch means inactive after the last tooth upon any saw of the series has been acted upon by the abrading means, a member operative to close the clutch means, means tending to actuate the said member, a trip member operatively engaged by the clutch closing member, latch means for restraining the trip member from movement under the influence of the means for moving the clutch closing member, the saw rotating means including a gear element constantly driven, a second gear element driven from the first-mentioned gear element, and a trip element mounted upon the last-mentioned gear element and arranged to engage and mounted thereon, a spring connected with the other arm of the said lever and tending to rock the lever in the direction stated, a keeper member upon the support, a latch element upon the trip plate engageable with the keeper member to normally restrain the trip plate against movement under the influence of the spring, means actuated through rotation of an element of the saw rotating means for rendering the latch element inactive after the last tooth upon any saw of the series has been acted upon by the abrading means, and means actuated through continued rotation of the said shaft subsequent to operation of the second-mentioned shaft-operated means, for breaking the said clutch.

72. In a machine of the class described, means for rotating a series of saws, an abrading means, means for actuating the abrading means to cause the same to operate successively upon the teeth of any saw in the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under the influence of the means for moving the clutch closing member, and means actuated through rotation of an element of the saw rotating means for rendering the latch means inactive after the last tooth upon any saw of the series has been acted upon by the abrading means.

73. In a machine of the class described, means for rotating a series of saws, an abrading means, means for actuating the abrading means to cause the same to operate successively upon the teeth of any saw in the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under the influence of the means for moving the clutch closing member, means actuated through rotation of an element of the saw rotating means for rendering the latch means inactive after the last tooth upon any saw of the series has been acted upon by the abrading means, and means operable to automatically reset the trip member and through the medium thereof the clutch closing member subsequent to actuation of the means for shifting the abrading means.

74. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under the influence of the means for moving the clutch closing member, means actuated through rotation of an element of the saw rotating means for rendering the latch means inactive after the last tooth upon any saw of the series has been acted upon by the abrading means, and means actuated through rotation of the said shaft for resetting the said trip member and clutch closing member subsequent to operation of the means for shifting the abrading means.

75. In a machine of the class described, means for rotating a series of saws, an abrading means, means for actuating the abrading means to cause the same to operate successively upon the teeth of any saw of the series, a shaft, means operable through rotation of the shaft for moving the abrading means clear of the saws, means operable through rotation of the shaft for shifting the abrading means from one saw to another in the series subsequent to operation of the first-mentioned shaft-operated means, means for returning the abrading means to active position, a constantly rotating gear element, means for mutually clutching the shaft and the said gear element, a member operative to close the clutch means, means tending to actuate the said member, a trip member operatively engaged by the clutch closing member, latch means for restraining the trip member from movement under influence of the means for moving the clutch closing member, means actuated through rotation render inactive the said latch means subsequent to the action of the abrading means upon the last tooth of any saw of the series.

79. In a machine of the class described, means for rotating a plurality of saws, an abrading means, means for imparting motion to the abrading element of the abrading means, means for intermittently moving the abrading means into and out of active relation to any saw of the series to act successively upon the teeth thereof, and means acting automatically upon cessation of action of the abrading means upon the last tooth of the saw for rendering the intermittent moving means inactive.

80. In a machine of the class described, means for rotating a plurality of saws, an abrading means, means for imparting motion to the abrading element of the abrading means, a rock shaft, means for intermittently rocking the shaft, means upon the shaft for coaction with the abrading means to move the same into and out of active relation to any saw of the series to act successively upon the teeth thereof, a shaft, means for automatically imparting motion thereto after the last tooth upon a saw has been acted upon by the abrading means, means actuated by the last-mentioned shaft for rocking and holding the rock shaft in a direction to position the abrading means clear of the treated saw, means for automatically shifting the abrading means to position opposite another saw of the series while so positioned, and means providing for movement of the abrading element into active relation to the last-mentioned saw subsequent to shifting of the abrading means.

81. In a machine of the class described, means for rotating a plurality of saws, an abrading means, means for imparting motion to the abrading element of the abrading means, a rock shaft, means for intermittently rocking the shaft, means upon the shaft for coaction with the abrading means to move the same into and out of active relation to any saw of the series to act successively upon the teeth thereof, a shaft, means for automatically imparting motion thereto after the last tooth upon a saw has been acted upon by the abrading means, the means for intermittently rocking the rock shaft including an arm thereon and means coacting with the said arm for oscillating the arm, a rocking member, means upon the second-mentioned shaft for coaction with the rocking member to impart motion thereto, the said rocking member coacting with the said arm upon the rock shaft whereby when the rocking member is actuated by the element upon the second-mentioned shaft the said arm will be moved to position to rock the rock shaft in a direction to position the abrading means clear of the treated saw, means for automatically shifting the abrading means to position opposite another saw of the series while so positioned and means providing for movement of the abrading element into active relation to the last-mentioned saw subsequent to shifting of the abrading means.

82. In a machine of the class described, means for rotating a plurality of saws, an abrading means, means for imparting motion to the abrading element of the abrading means, a rock shaft, means for intermittently rocking the shaft, means upon the shaft for coaction with the abrading means to move the same into and out of active relation to any saw of the series to act successively upon the teeth thereof, a shaft, means for automatically imparting motion thereto after the last tooth upon a saw has been acted upon by the abrading means, a cam upon the last-mentioned shaft, a rock lever having engagement at one side of its pivot with the said cam, the means for intermittently rocking the first-mentioned shaft including an arm carried thereby and a rotary cam coacting with the arm, the said rock lever at the opposite sides of its pivot being arranged for coaction with the said arm whereby when the rock lever is actuated by the cam the arm will be swung to position the abrading means clear of the treated saw, means for automatically shifting the abrading means to position opposite another saw of the series while so positioned, and means providing for movement of the abrading element into active relation to the last-mentioned saw subsequent to shifting of the abrading means.

83. In a machine of the class described, means for rotating a plurality of saws, an abrading means, means for imparting motion to the abrading element of the abrading means, a rock shaft, means for intermittently rocking the shaft, means upon the shaft for coaction with the abrading means to move the same into and out of active relation to any saw of the series to act successively upon the teeth thereof, a shaft, means for automatically imparting motion thereto after the last tooth upon a saw has been acted upon by the abrading means, the means for intermittently rocking the shaft including an arm connected with the shaft and a rotary cam coacting with the said arm, a rock lever arranged for coaction at one side of its pivot with the said arm, means upon the second-mentioned shaft for coaction with the rock lever at the other side of its pivot whereby in the rotation of the last-mentioned shaft the lever will be rocked to move the arm away from the cam and so move the rock shaft as to position the abrading means clear of the treated saw, means automatically movable into engagement with the rock lever subsequent to its actuation, to hold the said lever against return to normal position, means for automatically shifting the abrading means to position opposite another saw of the series while so positioned, and means for automatically rendering the holding means inactive after the abrading means has been shifted whereby to provide for movement of the abrading element into active relation to the last-mentioned saw subsequent to shifting of the abrading means.

84. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a detent engageable with the rock lever to restrain the same against return to normal position, means for automatically shifting the abrading means to position opposite another saw of the series while so positioned, and means for automatically rendering the detent inactive subsequent to shifting of the abrading means.

85. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a sliding detent member arranged when in one position, to engage the rock lever to restrain the same against return to normal position, means for shifting the said detent member to said position after the lever has been rocked by the means upon the second-mentioned shaft, means tending to shift the detent member out of engagement with the said rock lever, a trip plate engaged by an element of the said detent member, a latch element for holding the trip plate against movement in a direction to permit of retraction of the detent member from engagement with the rock lever, and means for automatically rendering the latch means inactive subsequent to shifting of the abrading element to position opposite the last-mentioned saw.

86. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a sliding detent member arranged when in one position to engage the rock lever to restrain the same against return to normal position, means for shifting the said detent member to said position after the lever has been rocked by the means upon the second-mentioned shaft, means tending to shift the detent member out of engagement with the said rock lever, a trip plate engaged by an element of the said detent member, a latch element for holding the trip plate against movement in a direction to permit of retraction of the detent member from engagement with the rock lever, and means actuated by an element of the means for rotating the saws, for rendering the latch means inactive subsequent to shifting of the abrading element to position opposite the last-mentioned saw.

87. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a shiftable detent member arranged when shifted in one direction, to engage the rock lever to restrain the same against movement to normal position, means tending to shift the detent member in the opposite direction, means actuated through the rotation of the last-mentioned shaft for shifting the detent member in the first-mentioned direction, latch means for holding the detent member against return shifting after actuation of the said means upon the second-mentioned shaft, and means for automatically rendering the latch means inactive subsequent to shifting of the abrading means to position opposite the last-mentioned saw.

88. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a shiftable member, a detent carried thereby and engageable with the rock lever when the shiftable member is moved in one direction, to restrain the said lever against return to normal position, means tending to shift the member in the opposite direction, an abutment element carried by the shiftable member, means upon the last-mentioned shaft for coaction with the said abutment element to shift the said member to bring the detent into active position, a trip member, an element carried by the shiftable member engaging the said trip member, latch means for holding the trip member against movement in a manner to permit of shifting of the shiftable member to move the detent element out of engagement with the rock lever, and means for automatically rendering the latch means inactive subsequent to shifting of the abrading element to position opposite the last-mentioned saw.

89. In a machine of the class described, means for rotating a plurality of saws, an abrading means, means for imparting motion to the abrading element of the abrading means, a rock shaft, an arm upon the shaft, means coacting with the arm for rocking the same to intermittently rock the said shaft, means upon the shaft for coaction with the abrading means to move the same into and out of active relation to any saw of the series to act successively upon the teeth thereof, a shaft, a rock lever arranged at one side of its pivot for coaction with the arm upon the first-mentioned shaft, means upon the second-mentioned shaft for coaction with the said rock lever at the other side of its pivot for actuating the same to move the arm and rock the first-mentioned shaft to position the abrading means clear of the treated saw, a shiftable member, a detent carried thereby and engageable with the rock lever when the shiftable member is moved in one direction, to restrain the said lever against return to normal position, means tending to shift the member in the opposite direction, an abutment element carried by the shiftable member, means upon the last-mentioned shaft for coaction with the said abutment element to shift the said member to bring the detent into active position, a trip member, an element carried by the shiftable member engaging the said trip member, latch means for holding the trip member against movement in a manner to permit of shifting of the shiftable member to move the detent element out of engagement with the rock lever, and means actuated through the means for rotating the saws, for automatically rendering the latch means inactive subsequent to shifting of the abrading element to position opposite the last-mentioned saw.

90. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, and means actuated through rotation of the shaft, subsequent to the shifting of the abrading means, for shifting the gear element to break the clutch.

91. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, and means automatically operable subsequent to the shifting of the abrading means for shifting the gearing element to break the clutch.

92. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, a shiftable member arranged to have thrusting engagement with the said gear element, and means upon the shaft arranged to actuate the said thrust member to shift the gear element to break the clutch subsequent to the shifting of the abrading means.

93. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, a slidable thrust pin arranged for coaction with the gear element, and a cam upon the shaft coacting with the thrust pin to shift the same to shift the gear element to break the clutch, subsequent to shifting of the abrading means.

94. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, means actuated through rotation of the shaft subsequent to the shifting of the abrading means and prior to completion of one revolution of the shaft, for shifting the gear element to break the clutch, and means for automatically completing the revolution of the shaft, and arresting its motion when its revolution has been completed.

95. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, means actuated through rotation of the shaft subsequent to the shifting of the abrading means and prior to completion of one revolution of the shaft, for shifting the gear element to break the clutch, an element fixed upon the shaft, and a resilient pull member coacting therewith to complete the revolution of the shaft and arrest the motion thereof.

96. In a machine of the class described, means for rotating a series of saws, shiftable abrading means, means for imparting motion to the abrading element of the abrading means, means for intermittently moving the abrading means into and out of active relation to any saw of the series to act successively upon the teeth thereof, a shaft, a shiftable constantly rotating gear element loose upon the shaft, a clutch member associated therewith, a clutch member fixed with relation to the shaft, means for automatically shifting the gear element and its associated clutch member to bring the latter into engagement with the fixed clutch member after all of the teeth upon one saw have been acted upon by the abrading element, means actuated through rotation of the shaft to move the abrading means to position with the abrading element clear of a treated saw, means actuated through rotation of the shaft to shift the abrading means from a treated saw to a saw to be treated, means providing for return of the abrading means to active position after having been shifted, means actuated through rotation of the shaft subsequent to the shifting of the abrading means and prior to completion of one revolution of the shaft, for shifting the gear element to break the clutch, a cam fixed upon the said shaft and having a reentrant cam surface, and a spring having a portion arranged to ride against the said surface subsequent to unclutching of the shaft and in riding against the said surface to rotate the cam and complete the revolution of the said shaft and arrest its motion.

97. In a machine of the class described, a drive shaft, means driven from the shaft for rotating a series of saws, an abrading element, means driven from the shaft for imparting motion to the abrading element, means driven from the shaft for intermittently moving the abrading element into and out of active relation to any saw of the series, means driven from the shaft for shifting the abrading element from a treated saw to a saw to be treated, a gear element upon the shaft, a power gear element movable into and out of gear with the element upon the shaft, and means operable automatically to move the power gear element out of gear with the first-mentioned gear element upon completion of the action of the abrading element upon the last tooth of the last saw of the series.

98. In a machine of the class described, a drive shaft, means driven from the shaft for rotating a series of saws, an abrading element, means driven from the shaft for imparting motion to the abrading element, means driven from the shaft for intermittently moving the abrading element into and out of active relation to any saw of the series, means driven from the shaft for shifting the abrading element from a treated saw to a saw to be treated, a gear element upon the shaft, a power gear element movable into and out of gear with the element upon the shaft, and means actuated through movement of the last-mentioned shaft operated means for moving the power gear element out of gear with the gear element upon the shaft subsequent to completion of action of the abrading element upon the last tooth of the last saw of the series.

99. In a machine of the class described, a drive shaft, means driven from the shaft for rotating a series of saws, an abrading element, means driven from the shaft for imparting motion to the abrading element, means driven from the shaft for intermittently moving the abrading element into and out of active relation to any saw of the series, means driven from the shaft for shifting the abrading element from a treated saw to a saw to be treated, a gear element upon the shaft, a power gear element movable into and out of gear with the element upon the shaft, a shiftable member operatively engaging the power gear element, a rock lever operatively connected with the shifting member at one side of its pivot, and an element shiftable with the abrading element for coaction with the rock lever at the other side of its pivot to shift the shiftable member to move the power gear element out of gear with the gear element upon the shaft automatically upon completion of the action of the abrading element upon the last tooth of the last saw of the series.

100. In a machine of the class described, means for rotating a saw, a drive shaft, a carriage having bearing means rotatably engaging the said shaft, an abrading element supported by the carriage for coaction with the saw, and gearing between the abrading element and the said shaft, the carriage being adapted to be swung about the shaft as a pivot upon its said bearing means and thereby moved into and out of operative position.

101. In a machine of the class described, a supporting frame structure, means therein for supporting and rotating a series of saws, a supporting frame shiftably mounted upon said frame structure, a carriage fixed upon the last-mentioned frame for shifting movement therewith, an abrading element mounted upon the carriage for coaction with the teeth of the saws and adapted to be presented to the saws of the series successively through shifting movement of the said last-mentioned frame and carriage, a drive shaft, gear connection between the drive shaft and the abrading element, and means upon the last-mentioned frame pivotally engaging the said drive shaft whereby the said frame and the parts supported thereby may be swung into and out of operative position about the said shaft as an axis.

102. In a machine of the class described, a supporting frame structure, means therein for supporting and rotating a series of saws, a supporting frame shiftably mounted upon the said frame structure, a carriage fixed upon the last-mentioned frame for shifting movement therewith, an abrading element mounted upon the carriage for coaction with the teeth of the saws and adapted to be presented to the saws of the series successively through shifting movement of the said last-mentioned frame and carriage, a drive shaft, gear connection between the drive shaft and the abrading element, means upon the last-mentioned frame pivotally engaging the said drive shaft whereby the said frame and the parts supported thereby may be swung into and out of operative position about the said shaft as an axis, and hoisting means mounted upon the supporting frame structure and adapted to be connected to an element fixed with relation to the last-mentioned frame and operable to raise and lower the said frame and parts supported thereby.

103. In a machine of the class described, a drive shaft, a gear element for operative connection with a saw shaft to be rotated, a shaft adjustable toward and from the drive shaft, a gear fixed upon the drive shaft, a gear removably mounted upon the last-mentioned shaft, gear connection between the last-mentioned shaft and the said gear element for the saw shaft, and means driven from the drive shaft for treating the saws upon the said saw shaft.

104. In a machine of the class described, a supporting frame structure, bearings therein for the rotatable support of a saw shaft, a shiftable thrust bearing within the frame for the engagement of one end of the shaft, a gear element having a hub designed to be removably fitted upon the shaft near the other end thereof, a drive shaft, a gear element driven from the drive shaft and meshing with the said removable gear element for the saw shaft, a saw treating mechanism upon the said frame structure, and gear means for driving the said mechanism from said drive shaft.

In testimony whereof I affix my signature.

REUBEN BENJAMIN CREASY. [L. S.]